US010156688B1

(12) United States Patent
Wang et al.

(10) Patent No.: US 10,156,688 B1
(45) Date of Patent: Dec. 18, 2018

(54) PASSIVE ALIGNMENT SYSTEM AND AN OPTICAL COMMUNICATIONS MODULE THAT INCORPORATES THE PASSIVE ALIGNMENT SYSTEM

(71) Applicant: Avago Technologies International Sales Pte. Limited, Singapore (SG)

(72) Inventors: Tak Kui Wang, San Jose, CA (US); Chung-Yi Su, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/679,227

(22) Filed: Aug. 17, 2017

(51) Int. Cl.
| G02B 6/26 | (2006.01) |
| G02B 6/42 | (2006.01) |
| G02B 7/00 | (2006.01) |
| G02B 27/62 | (2006.01) |
| G02B 6/36 | (2006.01) |

(52) U.S. Cl.
CPC ............ *G02B 6/423* (2013.01); *G02B 6/262* (2013.01); *G02B 6/36* (2013.01); *G02B 6/4204* (2013.01); *G02B 6/4236* (2013.01); *G02B 7/003* (2013.01); *G02B 27/62* (2013.01)

(58) Field of Classification Search
CPC ........ G02B 6/423; G02B 6/36; G02B 6/4204; G02B 6/4236; G02B 6/262; G02B 6/4232; G02B 6/4238; G02B 6/4257; G02B 7/003; G02B 7/62
USPC .......................................................... 385/52
See application file for complete search history.

(56) References Cited

U.S. PATENT DOCUMENTS

| 8,873,903 | B2 * | 10/2014 | Wessel ................... G11B 5/105 360/234.3 |
| 9,091,828 | B2 * | 7/2015 | Wessel .................. G11B 5/105 |
| 9,323,011 | B1 * | 4/2016 | Feng ..................... G02B 6/125 |
| 9,547,231 | B2 | 1/2017 | Wang et al. |
| 9,606,308 | B2 * | 3/2017 | Barwicz ............... G02B 6/4238 |
| 2001/0009597 | A1 * | 7/2001 | Alibert .................. G02B 6/423 385/52 |
| 2003/0077050 | A1 * | 4/2003 | Marion ................ F16M 11/041 385/90 |

(Continued)

FOREIGN PATENT DOCUMENTS

EP 0532015 3/1993

*Primary Examiner* — Ryan Lepisto
*Assistant Examiner* — Guy Anderson
(74) *Attorney, Agent, or Firm* — Sheridan Ross P.C.

(57) ABSTRACT

A passive alignment system is provided that comprises one or more first meltable elements disposed on a surface, one or more second meltable elements disposed on a surface and one or more first standoff devices. The first and second meltable elements transition from first and second premolten states, respectively, to first and second molten states, respectively, when subjected to first and second temperatures, respectively. In the first molten state, the first meltable elements control relative alignment between the surfaces in first and second dimensions. In the second molten state, the second meltable elements and the first standoff devices control relative alignment between the surfaces in a third dimension. The passive alignment system is suitable for use in a parallel optical communications module to precisely passively align ends of a plurality of optical fibers or waveguides with respective light sources or light detectors of the module.

24 Claims, 19 Drawing Sheets

(56) References Cited

U.S. PATENT DOCUMENTS

| | | | |
|---|---|---|---|
| 2005/0176161 A1* | 8/2005 | Bapst | G02B 6/42 |
| | | | 438/31 |
| 2009/0244874 A1* | 10/2009 | Mahajan | H01L 24/16 |
| | | | 361/809 |
| 2013/0228916 A1 | 9/2013 | Mawatari | |
| 2014/0133797 A1* | 5/2014 | Levy | G02B 6/425 |
| | | | 385/14 |
| 2014/0328596 A1* | 11/2014 | Mathai | G02B 6/4245 |
| | | | 398/116 |
| 2014/0341578 A1* | 11/2014 | Ho | H04J 14/0246 |
| | | | 398/68 |
| 2015/0241631 A1* | 8/2015 | Fish | G02B 6/1221 |
| | | | 385/14 |
| 2016/0070074 A1 | 3/2016 | Wang et al. | |
| 2018/0059354 A1* | 3/2018 | Gutierrez | G02B 7/003 |

* cited by examiner

PASSIVE ALIGNMENT SYSTEM AND AN OPTICAL COMMUNICATIONS MODULE THAT INCORPORATES THE PASSIVE ALIGNMENT SYSTEM

TECHNICAL FIELD OF THE INVENTION

The invention relates to passive alignment systems, and more particularly, to a passive alignment system that is suitable for use in optical communications module for precisely passively aligning optical waveguides and optical fibers with optoelectronic elements.

BACKGROUND OF THE INVENTION

Parallel optical communications modules have a plurality of optical channels, each of which includes a respective optoelectronic element that is optically aligned with an end of a respective optical waveguide or fiber. The parallel optical communications module may be a parallel optical transceiver module having both transmit and receive optical channels, a parallel optical transmitter module having only transmit optical channels, or a parallel optical receiver module having only receive optical channels. The optoelectronic elements are either light sources (e.g., laser diodes or light-emitting diodes (LEDs)) or light detectors (e.g., P-intrinsic-N (PIN) photodiodes). The optical fibers are either multi-mode optical fibers or single-mode optical fibers.

Multi-mode fibers are typically used in shorter network links whereas single-mode fibers are typically used in longer network links that have higher transmission bandwidths. The diameter of the light-carrying core of a typical single-mode fiber is between about 8 and 10 micrometers (microns) whereas the diameter of the light-carrying core of a typical multi-mode fiber is about 50 microns or greater. For this reason, active alignment techniques are typically used to align single-mode fibers with their respective light sources. Passive alignment techniques have been used to align multi-mode fibers with their respective light sources. In optical receivers, the apertures of photodiodes are decreasing in size due to requirements for higher speed, which is making it increasingly difficult to use passive alignment devices and techniques to precisely align the apertures of the photodiodes with the ends of multi-mode fibers.

Active alignment techniques typically involve using a machine vision system to align the fibers with their respective light sources and test and measurement equipment to test and measure the optical signal launched into the optical fiber by the light source as the optical signal passes out of the opposite end of the fiber. By using these active alignment techniques and equipment, a determination can be made as to whether the light source and the optical fiber are in precise alignment with one another.

Passive alignment techniques are performed without the laser being turned on. Typically, passive alignment is accomplished by aligning the component with a vision system and a precision alignment stage. Passive alignment can also be performed by mating a connector module that holds the ends of the optical fibers with the parallel optical communications module. Mating features on the connector module and on the parallel optical communications module ensure that the act of mating them brings the ends of the fibers into precise alignment with the respective light sources. When multi-mode optical fibers are used, such passive alignment techniques can provide sufficient alignment precision due to the relaxed alignment tolerances associated with the relatively large diameter of the fiber core.

Active alignment processes are much more costly and time consuming to perform than passive alignment processes and are difficult to perform in the field. Accordingly, it would be desirable to provide a parallel optical communications module that enables ends of a plurality of optical fibers or waveguides to be precisely passively aligned without turning on the respective optoelectronic elements (e.g., light sources and light detectors) of the module. Furthermore, it is desirable to provide a mechanism for alignment without having to use a vision system and precision alignment stage.

WRITTEN DESCRIPTION

Figure 1:
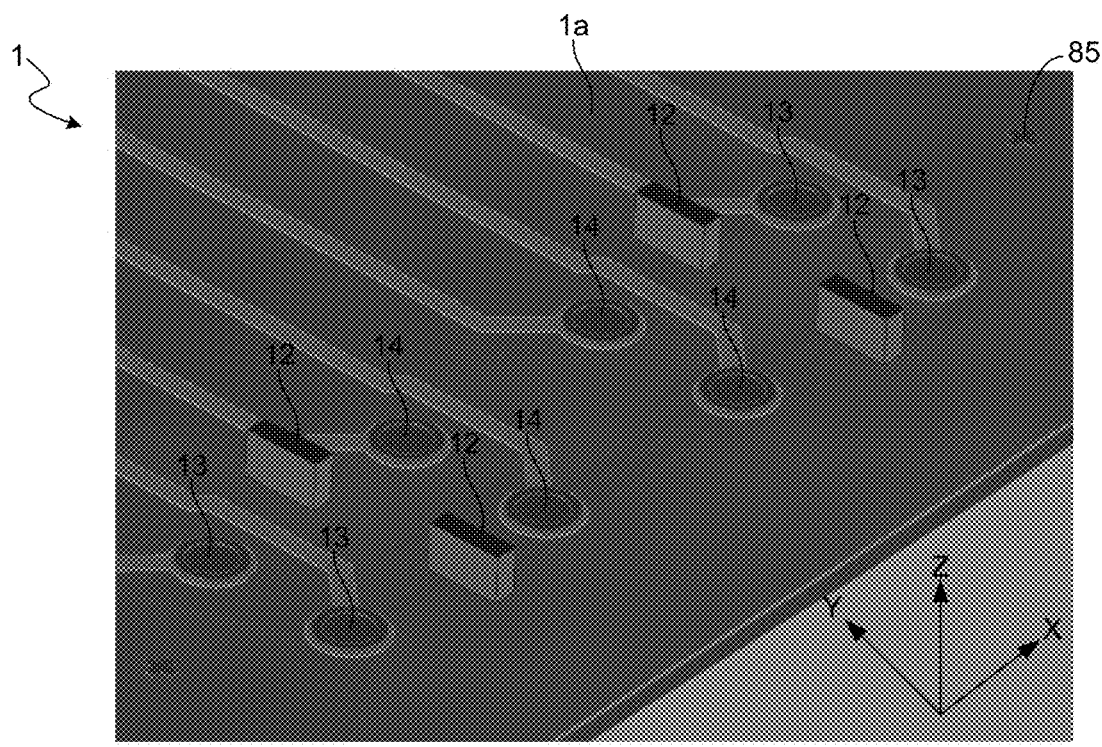
FIG. 1 illustrates a top perspective view of a portion of a submount that may be used in a parallel optical communications module in accordance with a representative embodiment.

In accordance with representative embodiments, a passive alignment system is provided that comprises one or more first meltable elements disposed on a first surface, one or more second meltable elements disposed on the first surface or on a second surface and one or more first standoff devices, each of which has a first end that is coupled to the first or second surface and a second end that is located a distance away from the respective first end. The first and second meltable elements transition from first and second pre-molten states, respectively, to first and second molten states, respectively, when subjected to first and second temperatures, respectively, where the second temperature is higher than the first temperature. In the first molten state, the first meltable elements control alignment of the first and second surfaces with one another in first and second dimensions. In the second molten state, the second meltable elements and the first standoff devices control alignment of the first and second surfaces with one another in a third dimension.

In accordance with a representative embodiment, the passive alignment system is employed in a parallel optical communications module to precisely passively align ends of a plurality of optical fibers with respective optical axes of respective light sources of the module. An optical assembly has a plurality of optical fibers disposed thereon at precisely-defined locations. A submount has at least a first laser chip mounted thereon at a precisely-defined location. An optical interface device interfaces the optical assembly with the submount. The alignment system precisely aligns the submount and the first laser chip with one another in the first, second and third dimensions and precisely aligns the submount and the optical interface device with one another in the first, second and third dimensions to thereby precisely align the ends of the optical waveguides with the respective optical axes of respective lasers of the first laser chip.

In the first and second molten states of first and second sets of the first and second meltable elements, respectively, of the alignment system, the first meltable elements of the first set control alignment of the submount and the first laser chip with one another in the first and second dimensions and the second meltable elements of the second set and a first set of the first standoff devices control alignment of the submount and the first laser chip with one another in the third dimension. In the first and second molten states of additional sets of the first and second meltable elements, respectively, the first meltable elements of the additional set of first meltable elements control alignment of the submount and the optical interface device with one another in the first and second dimensions and the additional set of the second meltable elements and an additional set of the standoff devices control alignment of the submount and the optical interface devices with one another in the third dimension.

In accordance with another representative embodiment, the passive alignment system is employed in a parallel optical communications module to precisely passively align ends of a plurality of optical fibers with respective optical axes of respective light detectors (e.g., PIN diodes) of the module. A submount has at least a first light detector chip mounted on a top surface thereof at a precisely-defined location and has ends of optical fibers coupled to the bottom surface thereof at precisely-defined locations. The submount also has a plurality of cone-shaped optical elements thereon, each of which has a relatively wide base portion that is in contact with the top surface of the submount and a relatively narrow tip portion that is spaced apart from the respective base portion by a preselected distance. Each base portion is in precise alignment with a respective optical fiber end coupled to the bottom surface of the submount opposite the top surface of the submount. The alignment system precisely aligns the submount and the first light detector chip with one another in the first, second and third dimensions to thereby precisely align the apertures of the light detectors with the respective tips of the cone-shaped optical elements in the first, second and third dimensions.

The term "meltable element," as that term is used herein, is intended to denote an element made of a material that melts when subjected to a particular temperature or temperature range and that eventually hardens to form a bond when it is no longer subjected to the particular temperature or temperature range. A solder element is one type of metallic element that meets this definition, and therefore the first and second meltable elements may be first and solder elements, respectively, that transition from first and second pre-molten states, respectively, to first and second molten states, respectively, at first and second temperatures, respectively. Suitable materials for the first and second solder elements are, for example, tin-bismuth and tin-silver, respectively. The inventive principles and concepts are not limited to using solder for this purpose. For example, one of the first and second meltable elements can be a photoresist element, which can be spun on and developed to have a shape like the second meltable element described below with reference to FIG. 2. When using non-metallic meltable elements, there needs to be a barrier around them. The barrier can be formed, for example, with a change in height, e.g., an elevated disc-shaped barrier on which the photoresist material is placed. Melting the photoresist will make a partial sphere for which the perimeter of the disc-shaped barrier acts as a boundary to contain the photoresist material when it is in molten form.

These and other representative embodiments are described below with reference to FIGS. 1-17. In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art.

It should also be understood that the word "example," as used herein, is intended to be non-exclusionary and non-limiting in nature. More particularly, the word "exemplary," as used herein, indicates one among several examples, and it should be understood that no undue emphasis or preference is being directed to the particular example being described. It should also be understood that the word "exemplary," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The term "substantially" means to within limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Where a first device is said to be directly connected or directly coupled to a second device, this encompasses examples where the two devices are connected together without any intervening devices other than bonding material or devices. Where a first device is said to be coupled to a second device, this encompasses examples where the two devices are directly connected together without any intervening devices other than bonding material or devices and examples where the first and second devices are connected to one another via one or more intervening devices.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 2:
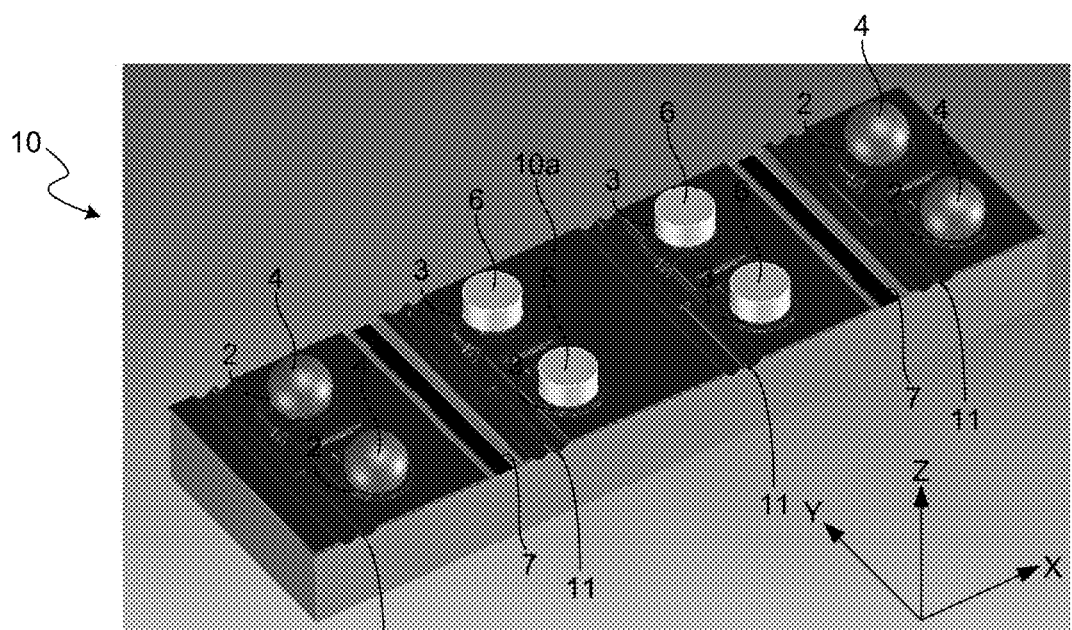
FIG. 2 illustrates a top perspective view of a first laser chip that is subsequently flip-chip mounted onto the submount shown in FIG. 1.

FIG. 1 illustrates a top perspective view of a portion of a submount 1 that may be used in a parallel optical communications module (not shown) in accordance with a representative embodiment. FIG. 2 illustrates a top perspective view of a first laser chip 10 that is subsequently flip-chip mounted onto the submount 1. The first laser chip 10 has a first set of electrical contacts 2 disposed at a first set of preselected locations on a first surface 10a of the first laser chip 10. The first laser chip 10 has a second set of electrical contacts 3 disposed at a second set of preselected locations on the first surface 10a of the first laser chip 10. A first set of first meltable elements 4 are disposed on respective electrical contacts of the first set of electrical contacts 2. A second set of second meltable elements 6 are disposed on respective electrical contacts of the second set of electrical contacts 3. The first laser chip 10 has reference surface areas 7 thereon that are at a predetermined height in the Z-dimension of an X, Y, Z Cartesian coordinate system. As will be described below in more detail with reference to FIGS. 3 and 4, the reference surface areas 7 and the optical axes of first lasers 11 of the first laser chip 10 are in the same Z-plane.

The submount 1 has a first set of first standoff devices 12, each having a first end that is coupled to a second surface 1a of the submount 1 and a second end that extends a preselected distance away from the second surface 1a. The submount 1 has electrical contacts 13 disposed at preselected locations thereon that come into contact with the first meltable elements 4 when the first surface 10a of the first laser chip 10 is facing the second surface 1a of the submount 1 and moved close enough to the second surface 1a to place the first meltable elements 4 in contact with the respective electrical contacts 13. The submount 1 has electrical contacts 14 disposed at preselected locations thereon that initially are not in contact with the second meltable elements 6 when the first meltable elements 4 are first placed in contact with the respective electrical contacts 13. As will be described below in detail, the second meltable elements 6 come into contact with the respective electrical contacts 14 during a melting process (e.g., a solder reflow process).

Figure 3:
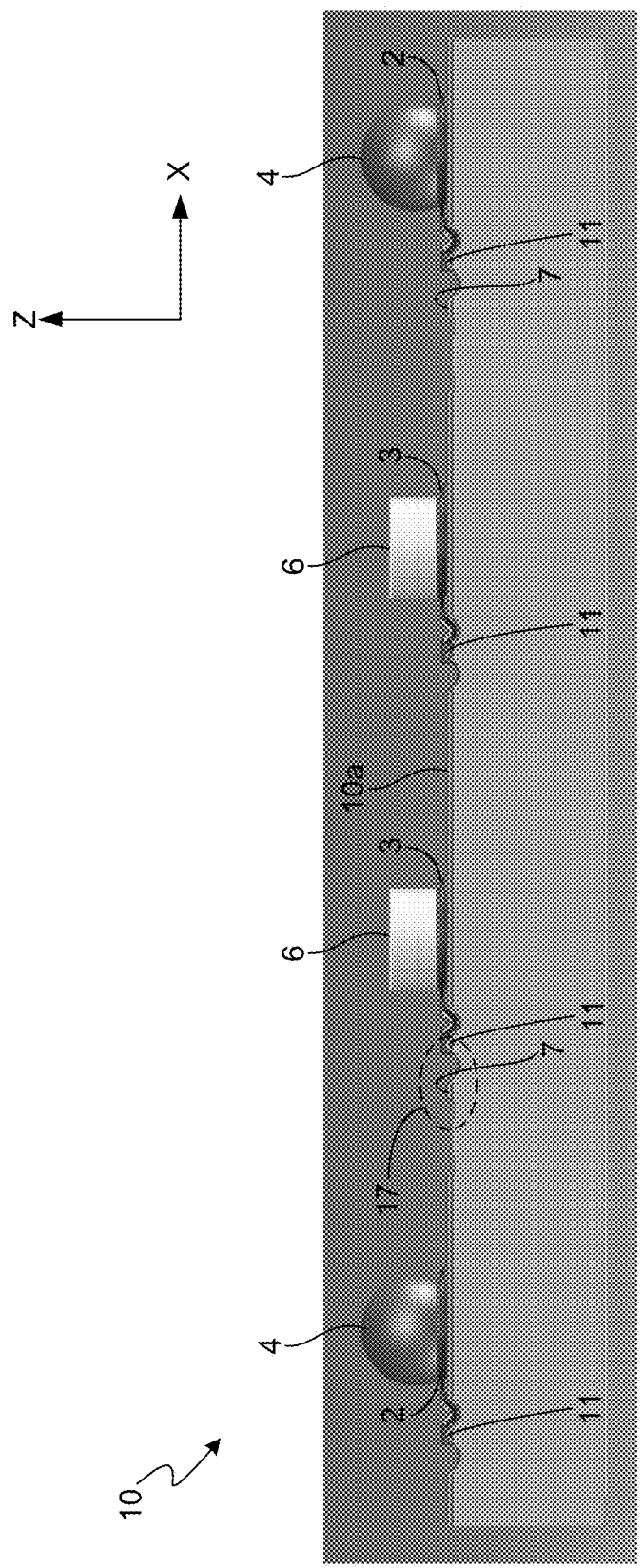
FIG. 3 illustrates a front plan view of the first laser chip shown in FIG. 2.
Figure 4:
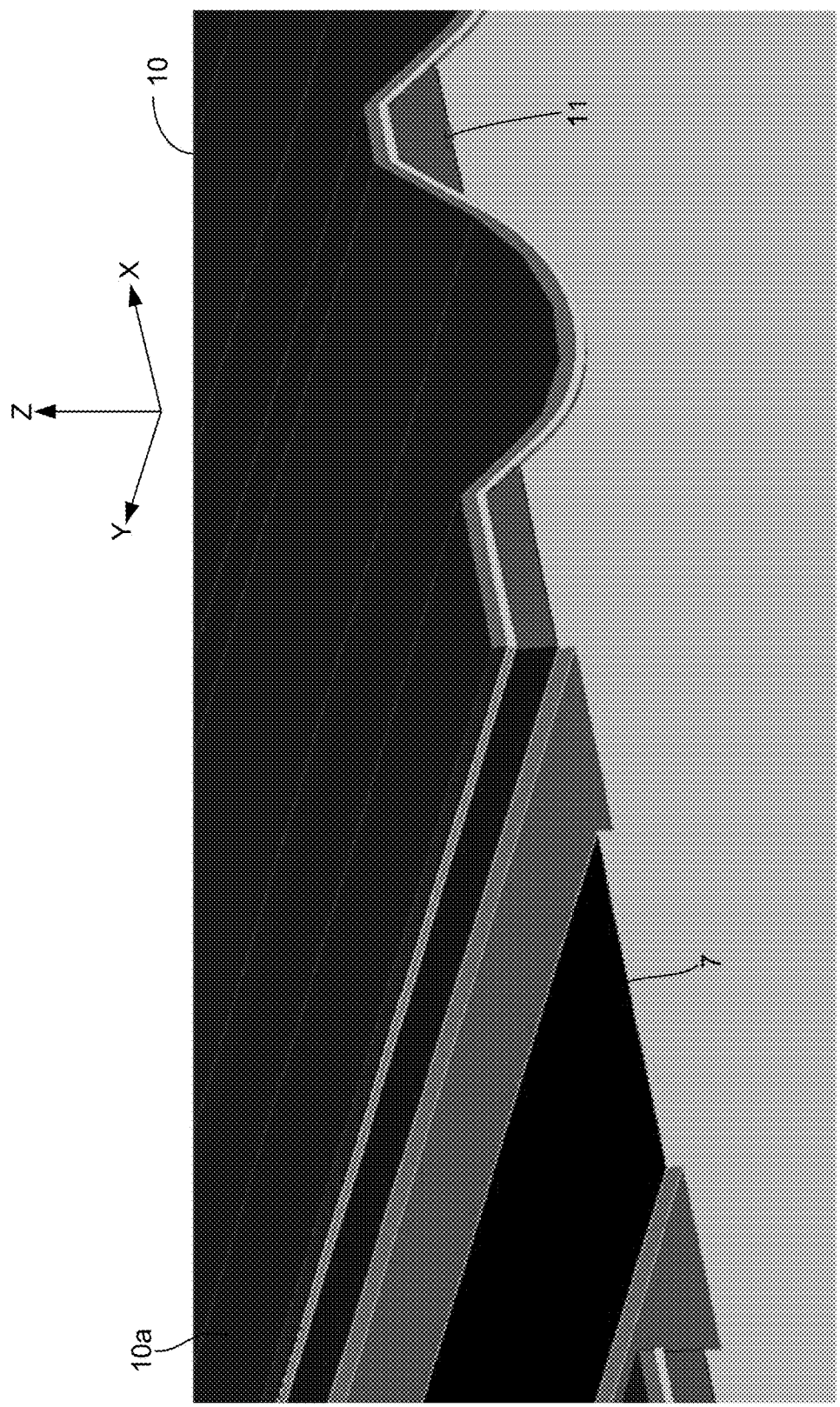
FIG. 4 illustrates an enlarged front perspective view of the portion of the first laser chip that is within the dashed circle 17 shown in FIG. 3.

FIG. 3 illustrates a front plan view of the first laser chip 10 shown in FIG. 2. The second meltable elements 6 are typically formed by electroplating. The first meltable elements 4 are typically formed by attaching solder spheres that melt at a lower temperature than the second meltable elements 6 onto the respective electrical contacts 2. Those skilled in the art will understand the manner in which such processes are performed. FIG. 4 illustrates an enlarged front perspective view of the portion of the first laser chip 10 that is within the dashed circle 17 shown in FIG. 3. When the first and second meltable elements 4 and 6, respectively, are in their first and second pre-molten states, respectively, as shown in FIGS. 2 and 3, the first meltable elements 4 are taller than the second meltable elements 6 in the Z-dimension. For this reason, the first meltable elements 4 come into contact with the respective electrical contacts 13 (FIG. 1) whereas the second meltable elements 6 do not come into contact with the respective electrical contacts 14 (FIG. 1) when the first surface 10a of the first laser chip 10 is facing the second surface 1a of the submount 1 and moved close enough to the second surface 1a to place the first meltable elements 4 in contact with the respective electrical contacts 13. With reference to FIG. 4, the tip of the emitting waveguide of the laser 11 is parallel to and at a known distance from the reference surface areas 7 in the Z direction. The distance should be zero or close to zero.

Figure 5A:
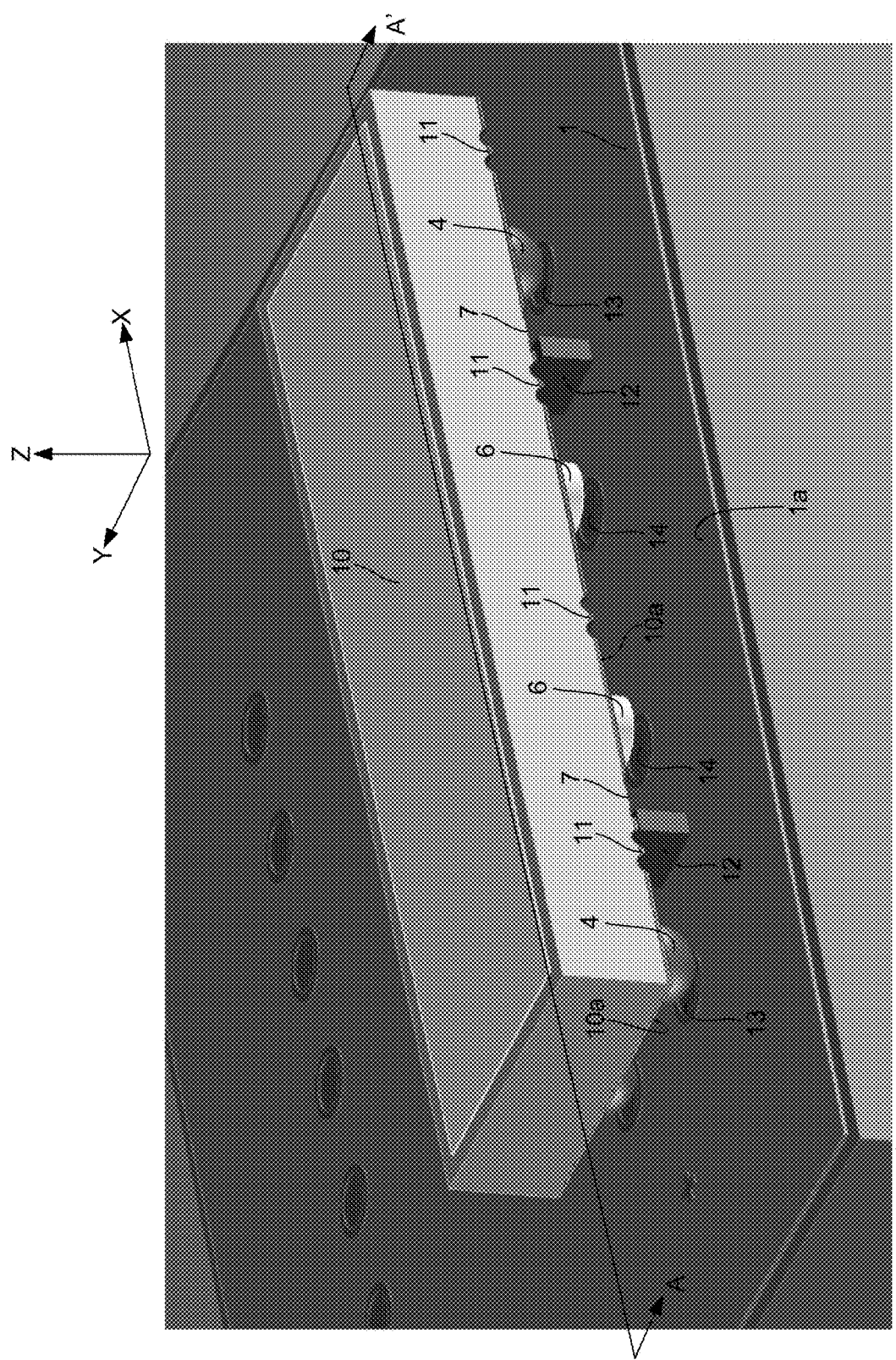
FIG. 5A illustrates a front perspective view of the first laser chip shown in FIGS. 2 and 3 in its initial flip-chip placement on the submount shown in FIG. 1.
Figure 5B:
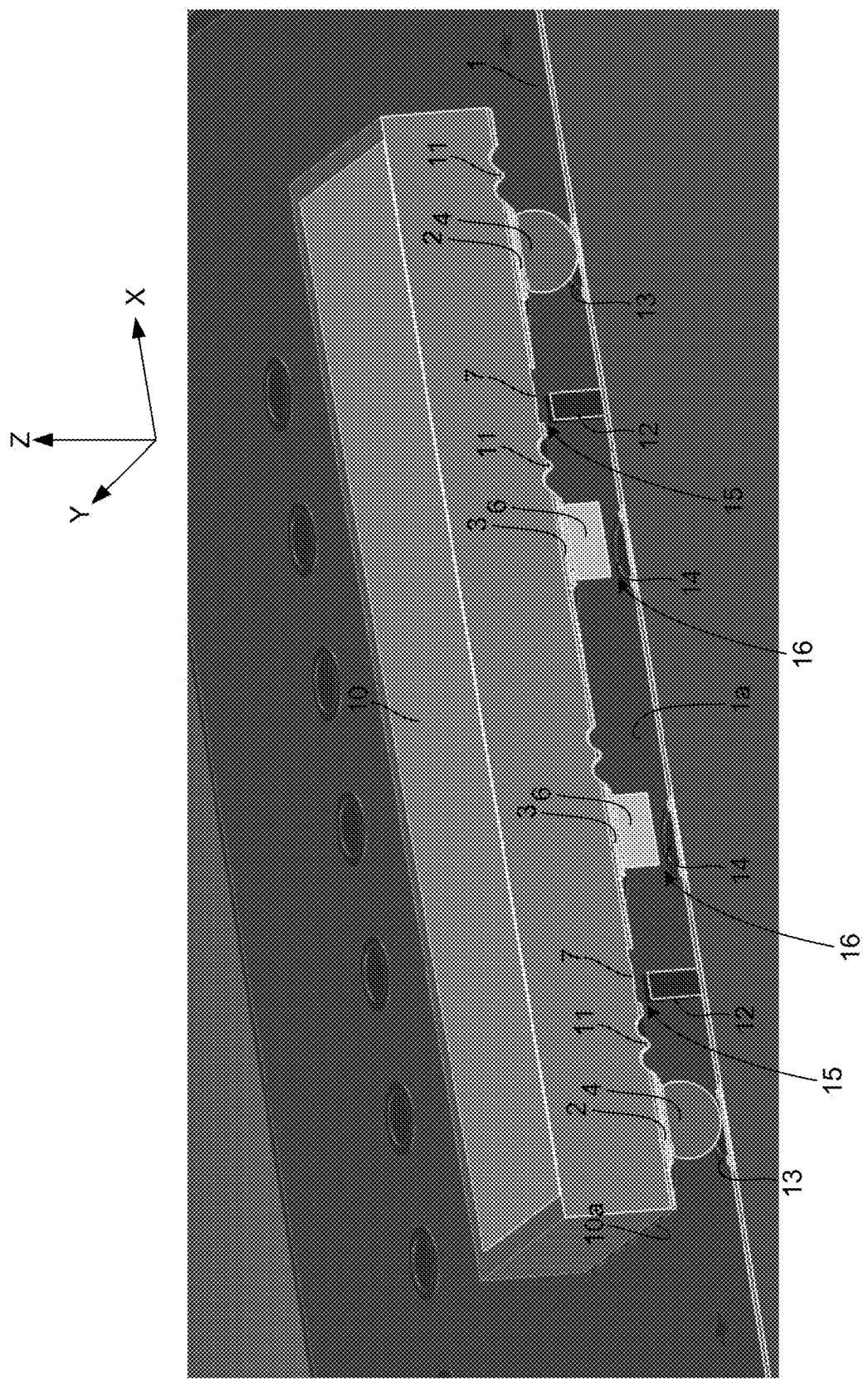
FIG. 5B illustrates a cross-sectional perspective view of the first laser chip in its initial flip-chip placement on the submount as shown in FIG. 5A taken along line A-A' of FIG. 5A.

FIG. 5A illustrates a front perspective view of the first laser chip 10 flip-chip placed on the submount 1 such that the first surface 10a of the first laser chip 10 faces the second surface 1a of the submount 1 and the first meltable elements 4 are in contact with the respective electrical contacts 13. In FIG. 5A, the laser chip 10 is intentionally shown to be slightly misaligned with the submount 1, as shown by the first meltable elements 4 not being symmetrically placed on the respective electrical contacts 13. FIG. 5B illustrates a cross-sectional perspective view of the first laser chip 10 flip-chip mounted on the submount 1 taken along line A-A' of FIG. 5A. In the first and second pre-molten states of the first and second meltable elements 4 and 6, respectively, shown in FIGS. 5A and 5B, the second meltable elements 6 are generally aligned with and spaced apart from the respective electrical contacts 14 and the second ends of the first standoff devices 12 are generally aligned with and spaced apart from the respective reference surface areas 7. Thus, there are gaps 16 in between the second meltable elements 6 and the respective electrical contacts 14 and there are gaps 15 in between the second ends of the standoff devices 12 and the respective reference surface areas 7. The gaps 15 and 16 are of preselected sizes in the Z-dimension.

Figure 6A:
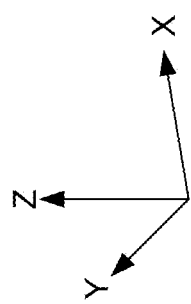
FIG. 6A illustrates a front perspective view of the first laser chip flip-chip mounted on the submount as shown in FIG. 5A after the first meltable elements have transitioned from the first pre-molten state to the first molten state and prior to the second meltable elements transitioning from the second pre-molten state to the second molten state.
Figure 6A:
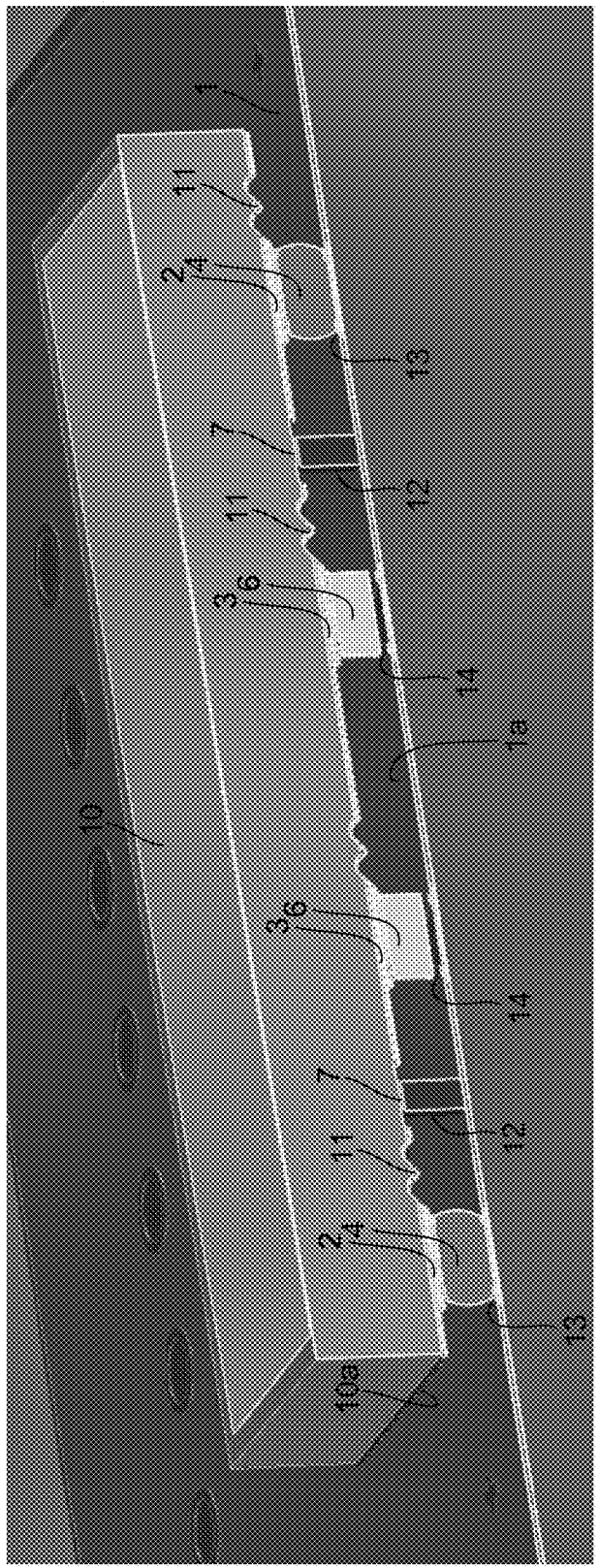
Figure 6B:
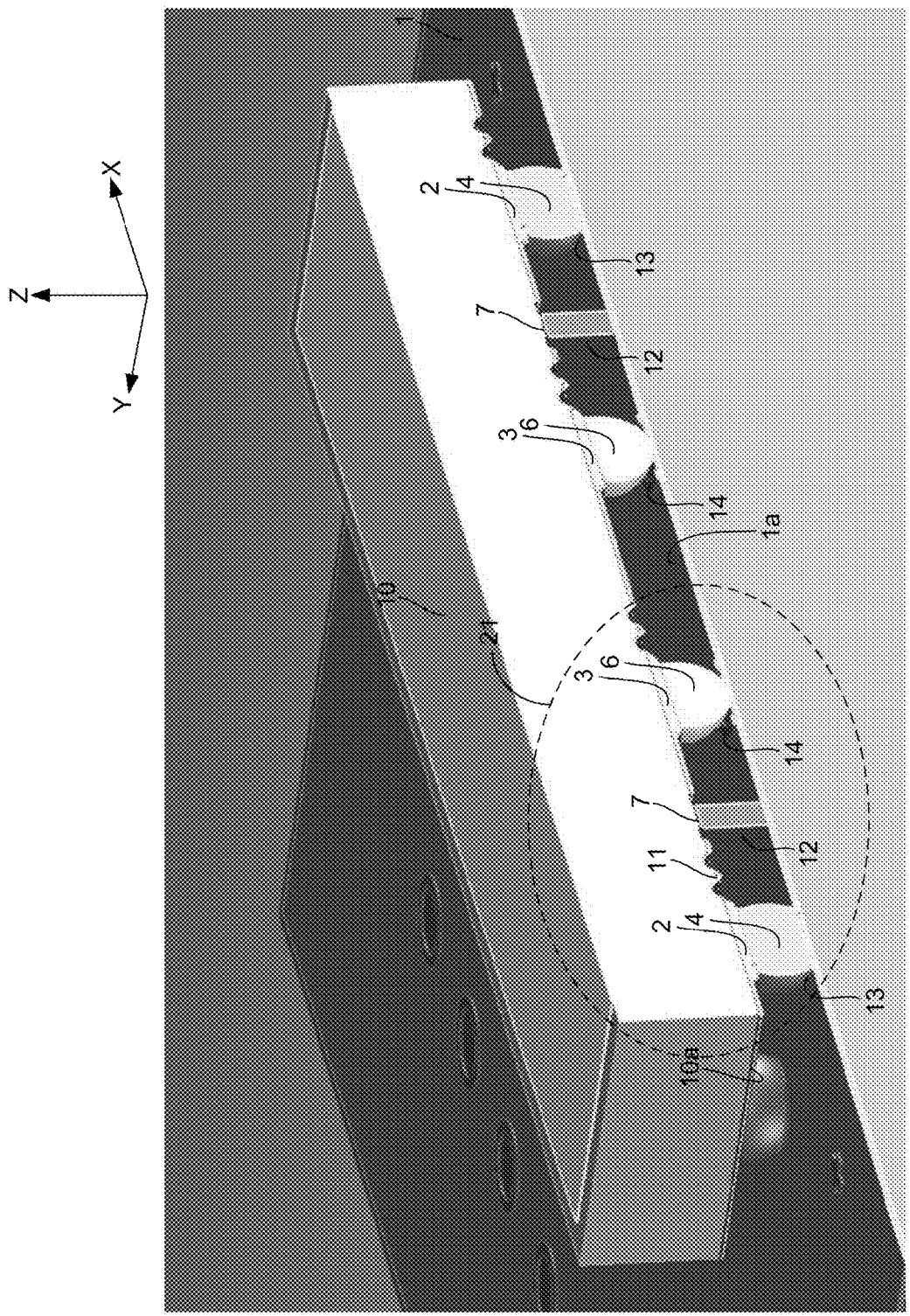
FIG. 6B illustrates a front perspective view of the first laser chip flip-chip mounted on the submount as shown in FIG. 6A after the first meltable elements have transitioned from the first pre-molten state to the first molten state and at the beginning of the second meltable elements transitioning from the second pre-molten state to the second molten state.
Figure 6C:
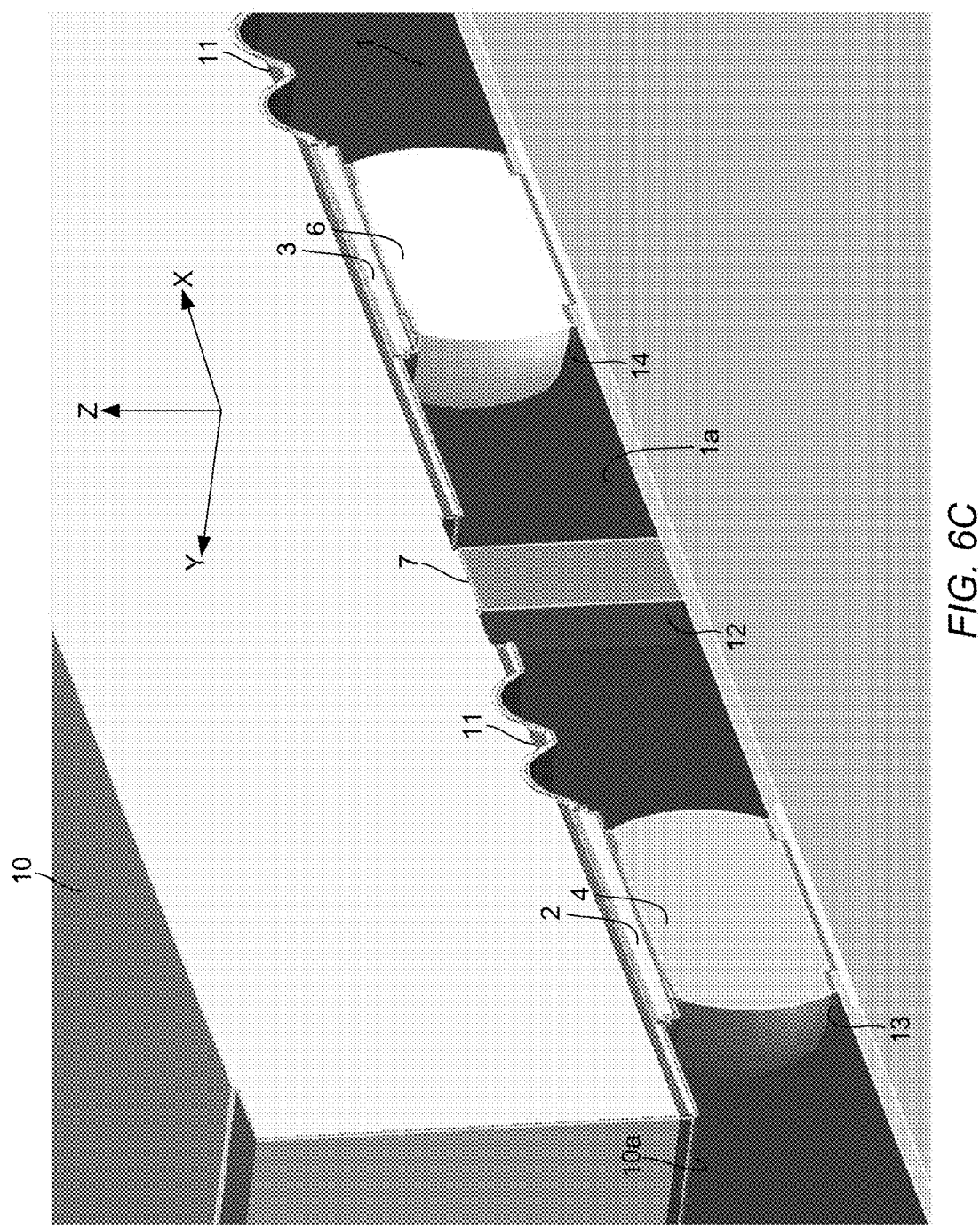
FIG. 6C illustrates a front perspective view of the portion of the first laser chip flip-chip mounted on the submount shown in the dashed circle 21 of FIG. 6B after the first and second meltable elements have transitioned from the first and second pre-molten states to the first and second molten states, respectively.

FIG. 6A illustrates a front perspective view of the first laser chip 10 flip-chip mounted on the submount 1 after the first meltable elements 4 have melted and prior to the second meltable elements 6 melting. The first laser chip 10 has aligned to submount 1 in X- and Y-dimensions due to the surface tension force of the first meltable elements 4. Both of the gaps 15 and 16 still exist, but they have decreased in size. FIG. 6B illustrates a front perspective view of the first laser chip 10 flip-chip mounted on the submount 1 after the first meltable elements 4 have transitioned to the first molten state and at the beginning of the transition of the second meltable elements 6 from the second pre-molten state to the second molten state when the second meltable elements 6 touch the respective electrical contacts 14. The second meltable elements 6 begin to wet the electrical contacts 14 and pull the first laser chip 10 closer to submount 1. When the reference surface areas 7 touch the second ends of the standoff devices 12, the size of the gap 15 is reduced to zero. When the first and second meltable elements 4 and 6, respectively, eventually cool down, the position of the first laser chip 10 is locked in with precise alignment with respect to submount 1. FIG. 6C illustrates a cross section view of the portion of the first laser chip 10 flip-chip mounted on the submount 1 shown in the dashed circle 21 of FIG. 6B after the first and second meltable elements 4 and 6, respectively, have fully transitioned to the first and second molten states, respectively.

As indicated above with reference to FIG. 5A, when the first meltable elements 4 are placed in initial contact with the respective electrical contacts 13, the first meltable elements 4 can be slightly misaligned with the respective electrical contacts 13. During the melting process (e.g., the solder reflow process), the first meltable elements 4 are first subjected to a first temperature that causes the first meltable elements 4 to transition from the first pre-molten state to the first molten state. The first temperature is below that which is required to cause the second meltable elements 6 to transition from the second pre-molten state to the second molten state.

When the first meltable elements 4 transition from the first pre-molten state to the first molten state, as depicted in FIG. 6A, surface tension between the first meltable elements 4 and the respective electrical contacts 13 precisely aligns the first meltable elements 4 with the respective electrical contacts 13 in the X- and Y-positions of the Cartesian coordinate system, which results in precise alignment of the submount 1 and the first laser chip 10 with one another. At this point in the process, the second meltable elements 6 and the first standoff devices 12 have not yet come into contact with the electrical contacts 14 and the reference surface areas 7, respectively, although the gaps 15 and 16 (FIG. 5B) have narrowed in the Z-dimension. The second meltable elements 6 are in the second pre-molten state at this point in the process.

With reference to FIG. 6B, while the first meltable elements 4 are in the first molten state, the second meltable elements 6 are subjected to the second temperature to cause the second meltable elements 6 to begin transitioning from the second pre-molten state to the second molten state. At this point in the process, the second meltable elements 6 come into contact with the respective electrical contacts 14. With reference to FIG. 6C, after the second meltable elements 6 have been subjected to the second temperature for a predetermined period of time, the second meltable elements 6 fully melt. As the second meltable elements 6 transition to the fully melted state shown in FIG. 6C, surface tension between the second meltable elements 6 and the respective electrical contacts 14 creates a force that pulls the first laser chip 10 in the Z-direction toward the submount 1 to narrow the gaps 15 until the second ends of the first standoff devices 12 are in abutment with the respective reference surface areas 7 of the first surface 10a of the first laser chip 10. Because the reference surface areas 7 are in precisely the same Z-plane as the lasers 11, abutment between the second ends of the first standoff devices 12 and the respective reference surface areas 7 brings the submount 1 and the first laser chip 10 into precise Z-dimensional alignment with one another.

Thus, it can be seen from the above description of FIGS. 1-6C that the passive alignment system comprising the first and second sets of the first and second meltable elements, respectively, and the first set of the first standoff devices precisely passively aligns the submount 1 and the first laser chip 10 in the X-, Y- and Z-directions. It should be noted that second meltable elements 6 and the first ends of the standoff devices 12 may be disposed on the first or second surfaces 10a and 1a, respectively, while still achieving the alignment functions described above with reference to FIGS. 1-6C. As will now be described with reference to FIGS. 7-14, additional sets of the first meltable elements 4, the second meltable elements 6 and the first standoff devices 12 of the passive alignment system are used to precisely passively align the submount 1 and the first laser chip 10 with other components of a parallel optical communications module such that ends of optical waveguides or optical fibers of the parallel optical communications module are precisely aligned in the X-, Y- and Z-dimensions with respective first lasers 11 of one or more of the first laser chips 10.

In accordance with this representative embodiment, the first laser chip 10 has four lasers 11, each of which has an optical axis that is parallel to the Y-axis and that lies in the same XY-plane in which the reference surface areas 7 lie. The invention is not limited with respect to the number of lasers 11 that the first laser chip 10 has. The first laser chip 10 can have any number, M, of lasers, where M is a positive integer that is greater than or equal to one.

Figure 7:
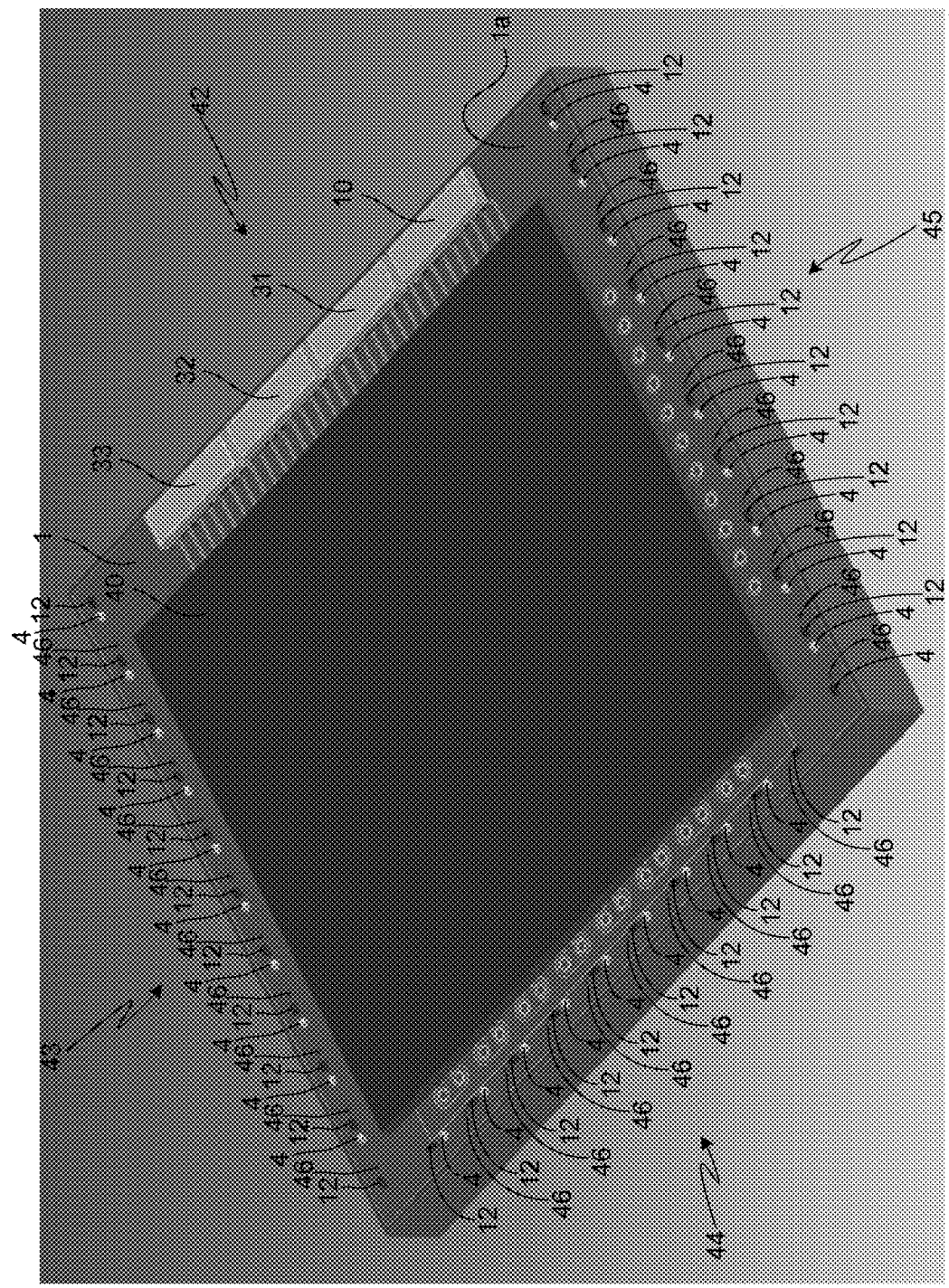
FIG. 7 illustrates a top perspective view of the populated submount having the first laser chip and second, third and fourth laser chips mounted on the second surface of the submount.

FIG. 7 illustrates a top perspective view of the populated submount 1 having the first laser chip 10 and second, third and fourth laser chips 31, 32 and 33, respectively, mounted on the second surface 1a of the submount. The second, third and fourth laser chips 31, 32 and 33, respectively, are mounted in such a way that they form a linear, 1-by-M array of lasers. In accordance with this representative embodiment in which there are four laser chips 10, 31, 32 and 33, each of which has four lasers, the laser chips 10, 31, 32 and 33 form a 1-by-16 linear array of lasers. The second, third and fourth laser chips 31, 32 and 33, respectively, are identical to the first laser chip 10 and are flip-chip mounted on the submount 1 and passively aligned with the submount 1 in the manner described above with reference to FIGS. 1-6C.

A first integrated circuit (IC) chip 40 is also flip-chip mounted on the second surface 1a of the submount 1 such that electrical contacts (not shown) disposed on the top surface of the first IC chip 40 are in direct contact with respective electrical contacts (not shown) disposed on the second surface 1a of the submount 1. The first IC chip 40 is electrically coupled via electrical traces (not shown) of the submount 1 to the electrical contacts 13 and 14 with which the first and second meltable elements 4 and 6, respectively, are in contact in order to establish electrical interconnections between the first IC chip 40 and the first, second, third and fourth laser chips 10, 31, 32 and 33, respectively. In accordance with this representative embodiment, the first IC chip 40 is a laser driver IC chip that delivers electrical data signals to the laser chips 10, 31, 32 and 33 that cause the respective first lasers 11 (FIG. 2) to generate optical data signals, which are then coupled into the ends of respective optical waveguides (not shown), as will be described below in more detail.

The submount 1 has first, second, third and fourth edges 42, 43, 44 and 45, respectively. The laser chips 10, 31, 32 and 33 are disposed along the first edge 42. A second set of the first meltable elements 4 and a second set of the first standoff devices 12 are disposed along the second edge 43 of the submount 1 at preselected locations on the second surface 1a of the submount 1. A third set of the first meltable elements 4 and a third set of the first standoff devices 12 are disposed along the third edge 44 of the submount 1 at preselected locations on the second surface 1a of the submount 1. A fourth set of the first meltable elements 4 and a fourth set of the first standoff devices 12 are disposed along the fourth edge 45 of the submount 1 at preselected locations on the second surface 1a of the submount 1. The second, third and fourth edges 43, 44 and 45, respectively, of the submount 1 also have electrical contacts 46 disposed thereon at preselected locations. Second, third and fourth sets of the first standoff devices 12 have first ends that are coupled to the second surface 1a of the submount 1 along the second, third and fourth edges 43, 44 and 45, respectively, of the submount 1

Figure 8:
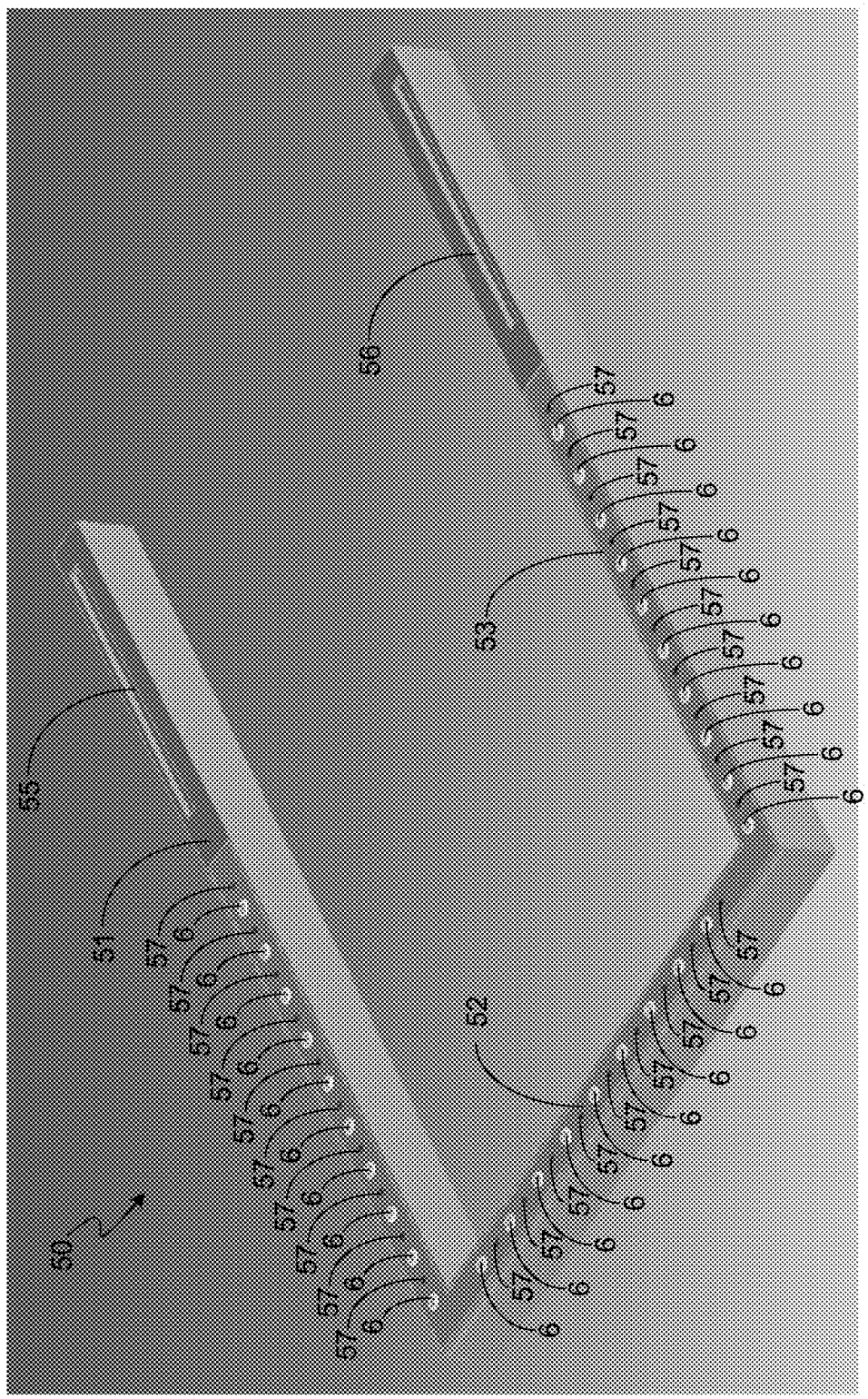
FIG. 8 illustrates a top perspective view of an optical interface device in accordance with a representative embodiment that mechanically couples with the submount shown in FIG. 7 via the passive alignment system.

FIG. 8 illustrates a top perspective view of an optical interface device 50 in accordance with a representative embodiment that mechanically couples with the submount 1 via the passive alignment system. The optical interface device 50 has third, fourth and fifth surfaces 51, 52 and 53, respectively. The third and fifth surfaces 51 and 53, respectively, have first and second grooves 55 and 56, respectively, formed therein that are used for aligning the optical interface device 50 with an optical assembly (not shown), as will be described below in more detail with reference to FIG. 13. The third, fourth and fifth surfaces 51, 52 and 53, respectively, of the optical interface device 50 have second, third and fourth sets, respectively, of the second meltable elements 6 disposed thereon at preselected locations. The third, fourth and fifth surfaces 51, 52 and 53, respectively, of the optical interface device 50 also have electrical contacts 57 disposed thereon at preselected locations.

Figure 9:
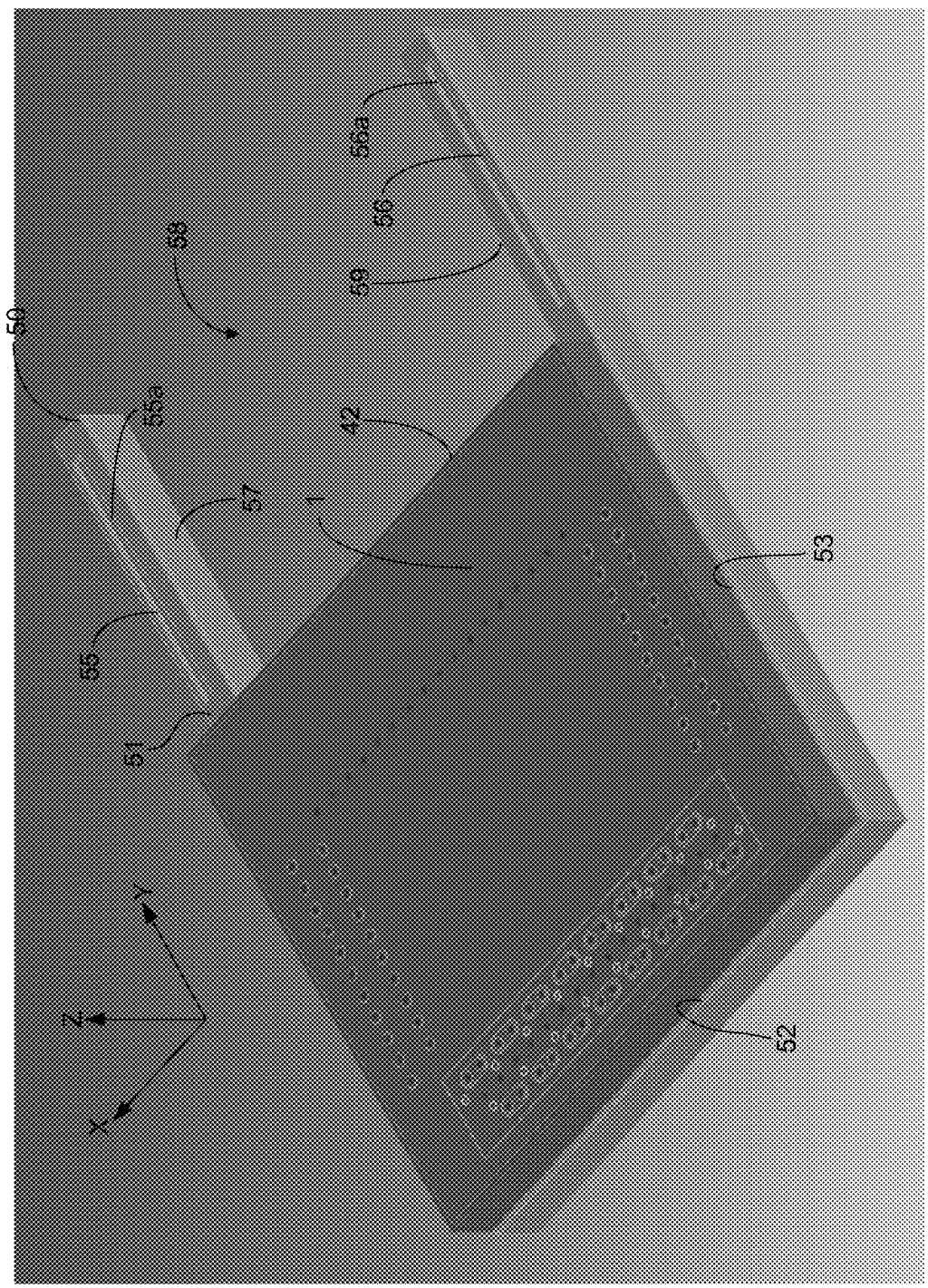
FIG. 9 illustrates a perspective view of the populated submount shown in FIG. 7 flipped over and mounted on the optical interface device shown in FIG. 8.

FIG. 9 illustrates a perspective view of the populated submount 1 shown in FIG. 7 flipped over and mounted on the optical interface device 50. In the second pre-molten state, the second, third and fourth sets of the second meltable elements 6 disposed on the third, fourth and fifth surfaces 51, 52 and 53, respectively, of the optical interface device 50 are generally aligned with and spaced apart from respective electrical contacts 46 disposed along the second, third and fourth edges 43, 44 and 45, respectively, of the submount 1. In the first pre-molten state, the second, third and fourth sets of the first meltable elements 4 disposed along the second, third and fourth edges 43, 44 and 45, respectively, of the submount 1 are in contact with respective electrical contacts 57 disposed on the third, fourth and fifth surfaces 51, 52 and 53, respectively, of the optical interface device 50. The second ends of the first standoff devices 12 that are disposed along the second, third and fourth edges 43, 44 and 45, respectively, of the submount 1 are spaced apart from the third, fourth and fifth surfaces 51, 52 and 53, respectively, of the optical interface device 50.

After the populated submount 1 and the optical interface device 50 have been placed in the mounted arrangement shown in FIG. 9, the melting process (e.g., the solder reflow process) described above is performed to cause the second, third and fourth sets of the first meltable elements 4 disposed along the second, third and fourth edges 43, 44 and 45, respectively, of the submount 1 to transition from the first pre-molten state to the first molten state. When these sets of the first meltable elements 4 transition from the first pre-molten state to the first molten state, surface tension between the first meltable elements 4 (FIG. 7) and the respective electrical contacts 57 (FIG. 8) causes the submount 1 to precisely align with the optical interface device 50 in the X- and Y-dimensions.

After alignment in the X- and Y-dimensions has been achieved, the temperature is raised to the second temperature to cause the second, third and fourth sets of the second meltable elements 6 disposed on the third, fourth and fifth surfaces 51, 52 and 53, respectively, of the optical interface device 50 to transition from the second pre-molten state to the second molten state. When these sets of the second meltable elements 6 transition from the second pre-molten state to the second molten state, surface tension between the second meltable elements 6 (FIG. 8) and the respective electrical contacts 46 (FIG. 7) causes the populated submount 1 to move in the Z-direction toward the optical interface device 50. This movement brings the second ends of the second, third and fourth sets of the standoff devices 12 (FIG. 7) into abutment with the third, fourth and fifth surfaces 51, 52 and 53, respectively, of the optical interface device 50, thereby precisely aligning the populated submount 1 with the optical interface device 50 in the Z-dimension.

The third, fourth and fifth surfaces 51, 52 and 53, respectively, of the optical interface device 50 are in the same Z-plane as the reference surface areas 7 such that abutment of the second ends of the first standoff devices 12 with the third, fourth and fifth surfaces 51, 52 and 53, respectively, brings the populated submount 1 into precise Z-dimensional alignment with the optical axes of the lasers of the first, second, third and fourth laser chips 10, 31, 32 and 33, respectively. An opening 58 is partially defined by the first edge 42 of the submount 1 and by opposite sides 57 and 59 of the optical interface device 50.

Figure 10:
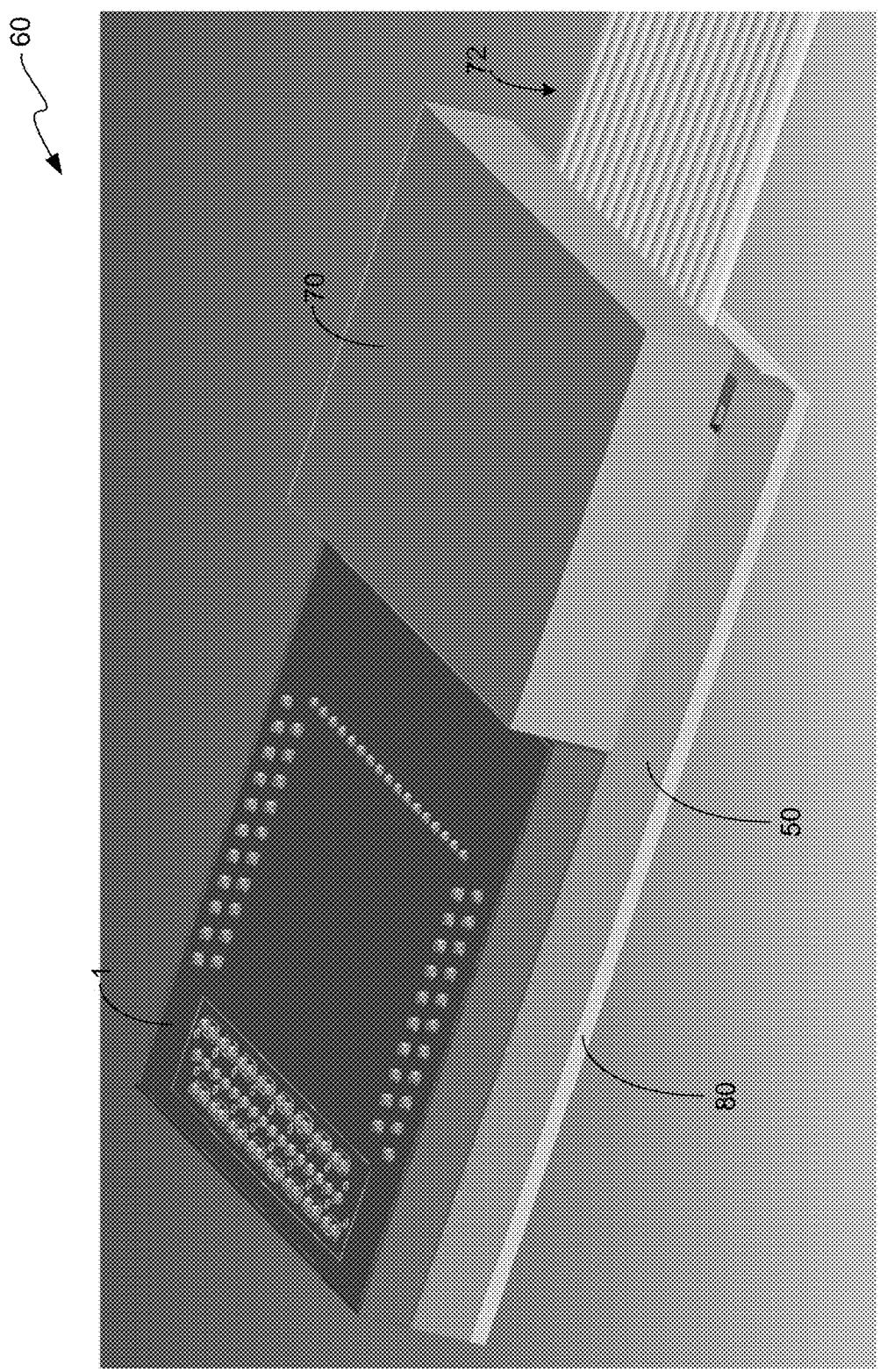
FIG. 10 illustrates a top perspective view of a parallel optical communications module in accordance with a representative embodiment.

FIG. 10 illustrates a top perspective view of a parallel optical communications module 60 in accordance with a representative embodiment comprising the populated submount 1 and the optical interface device 50 mechanically coupled with one another as shown in FIG. 9, the passive alignment system described above (not shown), an optical assembly 70 mechanically coupled with the optical interface device 50, and a heat sink device 80 mechanically and thermally coupled to the optical interface device 50 and to the populated submount 1.

Figure 11:
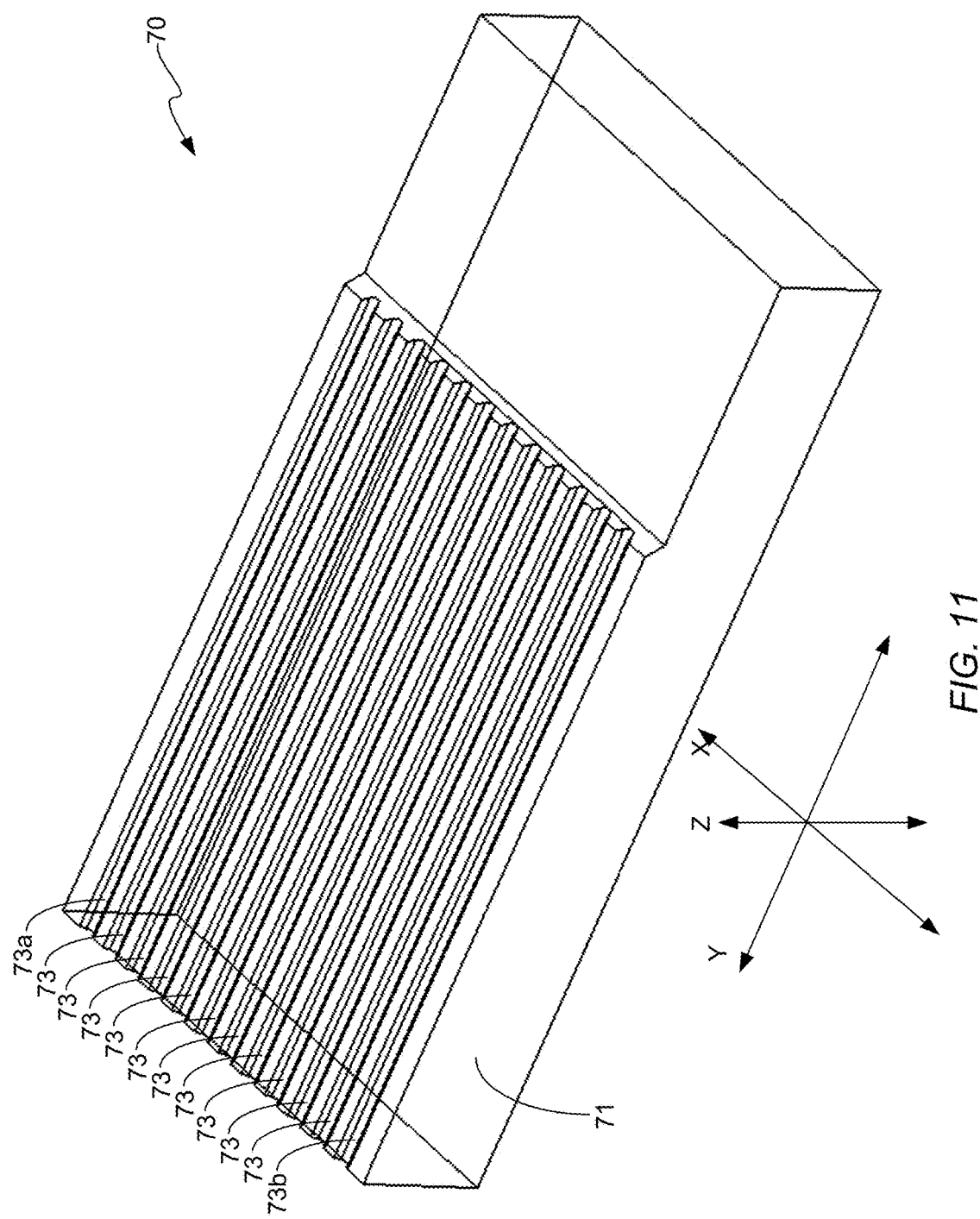
FIG. 11 illustrates a perspective view of the optical assembly shown in FIG. 10 in accordance with this representative embodiment having V-grooves formed in it for holding respective optical fibers.

FIG. 11 illustrates a perspective view of the optical assembly 70 that shows V-grooves 73 disposed in a body 71 of the optical assembly. In the perspective view shown in FIG. 11, the optical fibers have not yet been installed in the V-grooves 73 of the body 71 of the optical assembly 70.

Figure 12:
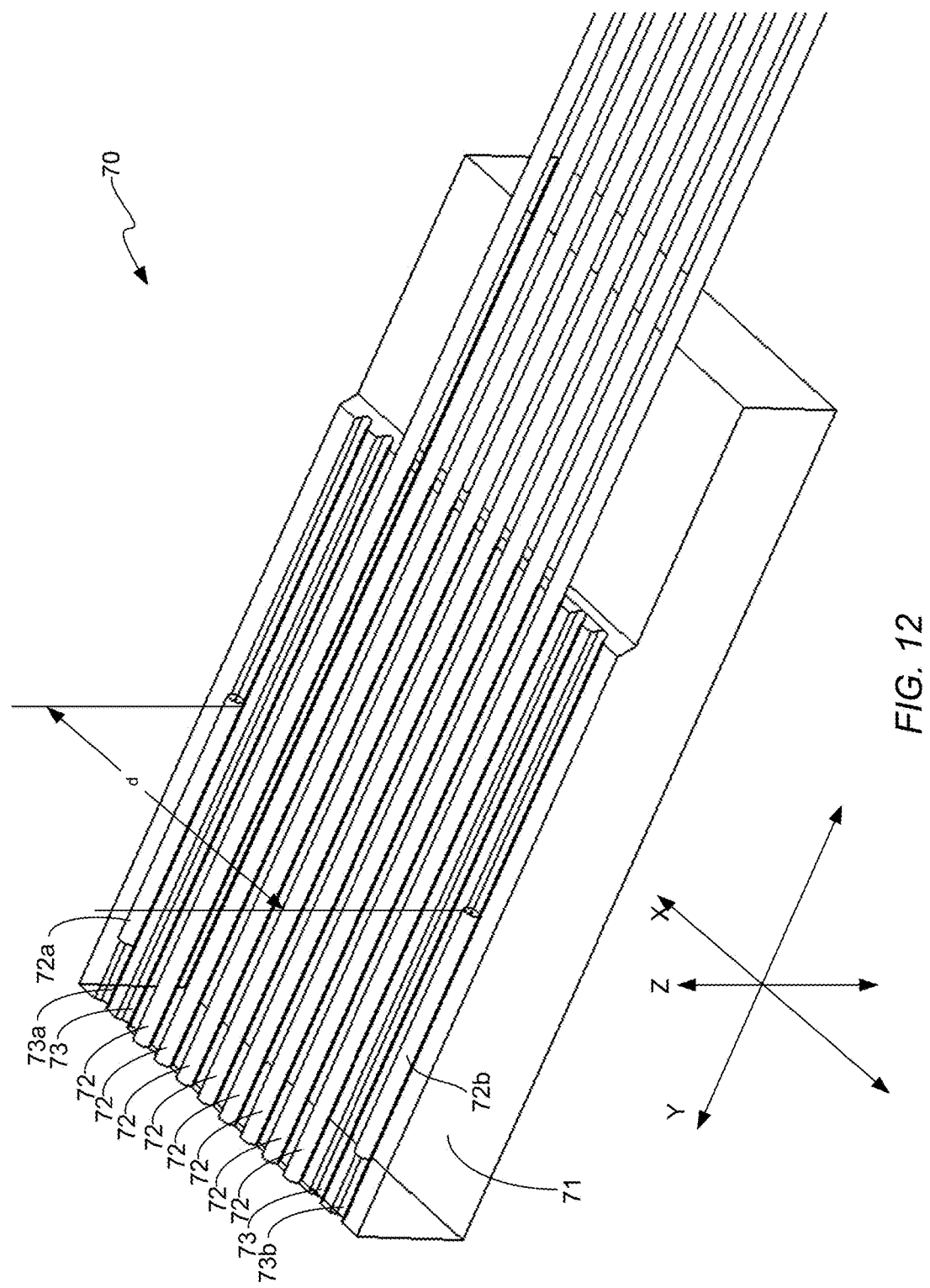
FIG. 12 illustrates a perspective view of the optical assembly shown in FIG. 11 having a plurality of optical fibers installed in the V-grooves.

FIG. 12 illustrates a perspective view of the body 71 of the optical assembly 70 having a plurality of optical fibers 72 installed in the V-grooves 73.

Figure 13:
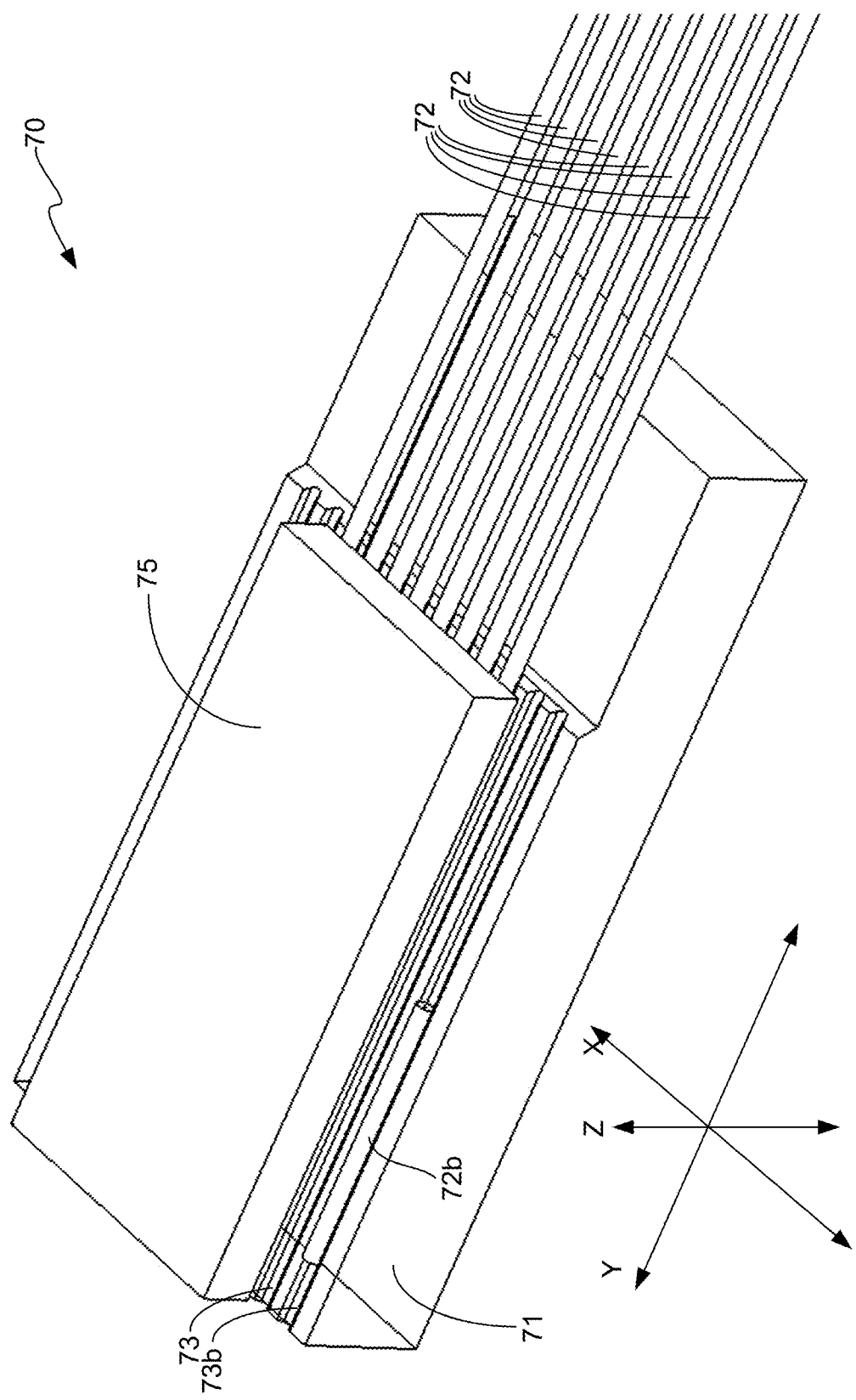
FIG. 13 illustrates a perspective view of the optical assembly shown in FIG. 11 having the plurality of optical fibers installed in the V-grooves and having a cover secured thereto by epoxy (not shown).

FIG. 13 illustrates a bottom perspective view of the body 71 of the optical assembly 70 having the plurality of optical fibers 72 installed therein and having a cover 75 secured thereto by epoxy (not shown).

The optical assembly 70 and the manner in which it couples with the optical interface device 50 will now be described with reference to FIGS. 9-13. The body 71 of the optical assembly 70 has V-grooves 73 formed in it in which the optical fibers 72 are installed. The outermost V-grooves 73a and 73b have first and second alignment fibers 72a and 72b disposed therein, respectively.

The cover 75 that is secured to the body 71 mates with the opening 58 (FIG. 9) formed in the optical interface device 50. The cover 75 is typically, but not necessarily, made of the same material as the body 71 of the optical assembly 70. The body 71 of the optical assembly 70 is typically made of the same material as the optical interface device 50, which typically comprises silicon. The body 71 of the optical assembly 70 and the cover 75 of the optical assembly 70 typically have the same thickness to avoid thermal expansion differences that can cause bowing. The body 71 and the cover 75 are typically made of material of the same thermal expansion property as the optical interface device 50 (e.g., silicon, borosilicate glass).

The fibers 72, 72a and 72b have tightly controlled identical diameters. Therefore, when the fibers 72, 72a and 72b are disposed in their respective V-grooves 73, 73a and 73b, the centers of the end faces of the fibers 72, 72a and 72b are spaced apart from one another by equal distances with tight accuracy. When the optical assembly 70 is mated with the optical interface device 50 such that alignment fibers 72a and 72b are fully engaged with the grooves 56 and 55, respectively, and such that one or more surfaces of the optical assembly 70 abut one or more surfaces of the submount 1 and/or of the heat sink device 80 in the Y-direction, the ends of the fibers 72 are precisely aligned in the X, Y and Z dimensions with the respective lasers 11 (FIG. 3) with precise accuracy. The distance between the inner edges 55a and 56a (FIG. 9) of the grooves 55 and 56, respectively, is controlled with very high accuracy during an etching process that is used to form the grooves 55 and 56 to ensure that the alignment of the optical assembly 70 with the optical interface device 50 in the X-dimension is accurate. The grooves 55 and 56 have a width that is greater than the diameter of the alignment fibers 72a and 72b to allow the alignment fibers 72a and 72b to easily locate the grooves 56 and 55, respectively. The distance between the inner edges 55a and 56a of the grooves 55 and 56 is equal to the inner perimeter distance, d, between the alignment fibers 72a and 72b (FIG. 12).

Although only eight optical fibers 72 are shown in FIG. 12, the parallel optical communications module 60 could be configured to use any number, N, of optical fibers 72, where N is a positive integer that is equal to or greater than 1. For example, in the representative embodiment shown in FIG. 7, there are four laser chips 10, 31, 32 and 33, each of which has four lasers for generating four respective laser light beams. Therefore, in the case in which the populated submount 1 has the configuration shown in FIG. 7, the optical assembly 70 will hold sixteen optical fibers for carrying the sixteen laser light beams generated by the laser chips 10, 31, 32 and 33.

In accordance with a representative embodiment, the submount 1 and the optical interface device 50 are formed using semiconductor fabrication processes, such as, for example, photolithography and etching. Using semiconductor fabrication techniques to form the submount 1 and the optical interface device 50 allows mating features and alignment features on them to have very precise shapes and sizes and to be formed at very precisely-defined locations. The optical interface device 50 is preferably made from a silicon-on-insulation (SOI) wafer, but may be made of any suitable material. An SOI wafer consists of three layers, namely, a device layer, and oxide layer and a handle layer. The device and handle layers are typically silicon. The device layer and the oxide layer thicknesses can be controlled with high precision.

Figure 14:
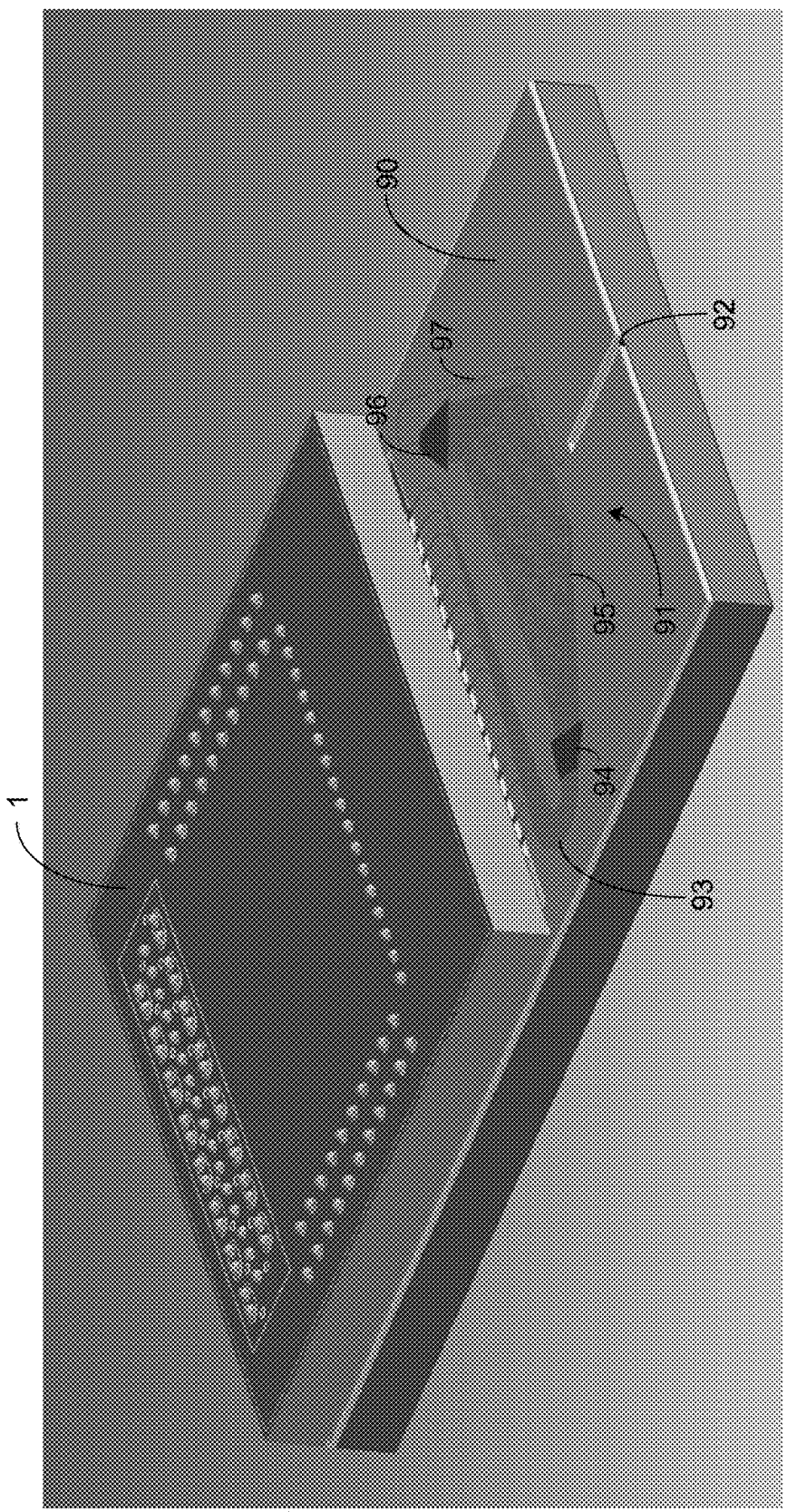
FIG. 14 illustrates a top perspective view of the populated submount shown in FIG. 7 mounted on an optical assembly in accordance with a representative embodiment in which the optical assembly comprises an array waveguide grating (AWG).

FIG. 14 illustrates a top perspective view of the populated submount 1 shown in FIG. 7 mounted on an optical assembly 90 in accordance with a representative embodiment in which the optical assembly 90 is an optical waveguide assembly that comprises an array waveguide grating (AWG) 91. The AWG 91 of the optical assembly 90 is typically formed by forming an oxide layer on top of a substrate, forming a patterned silicon or nitride layer on top of the oxide layer, and forming another oxide layer on top of the patterned silicon or nitride layer. The AWG 91 is formed in the patterned silicon or nitride layer, which is patterned to create areas of high and low refractive indices such that the light is confined in the areas having the high refractive index. Because AWG technology is well known, a detailed discussion of the various elements of the AWG 91 and the manner in which they operate will not be described herein. In this representative embodiment, the N lasers generate N different wavelengths of light and the AWG 91 operates as a multiplexer that combines the N wavelengths of light into an N-wavelength light beam that is output from the optical assembly 90 via an output port 92 that couples with an end of an optical fiber (not shown).

In the example shown in FIG. 7 in which N=16, i.e., there are N lasers, sixteen optical waveguide portions 93 guide the respective laser light beams to a beam expander 94 that expands each of the N laser light beams and directs a portion of each of the N laser light beams onto P optical waveguide array portions 95 that are of different predetermined lengths such that when the different portions of each of the N laser light beams arrive at a beam combiner 96, they are in phase at the output of the beam combiner 96, where P is a positive integer. A single optical waveguide 97 carries the N-wavelength optical signal to the output port 92 where the N-wavelength optical signal is coupled onto an optical fiber (not shown). In this way, the AWG 91 performs wavelength division multiplexing. The optical port 92 is also precision-formed by lithography and the SOI wafer with precise handle and oxide layer thicknesses to align an output fiber with waveguide 97.

Figure 15:
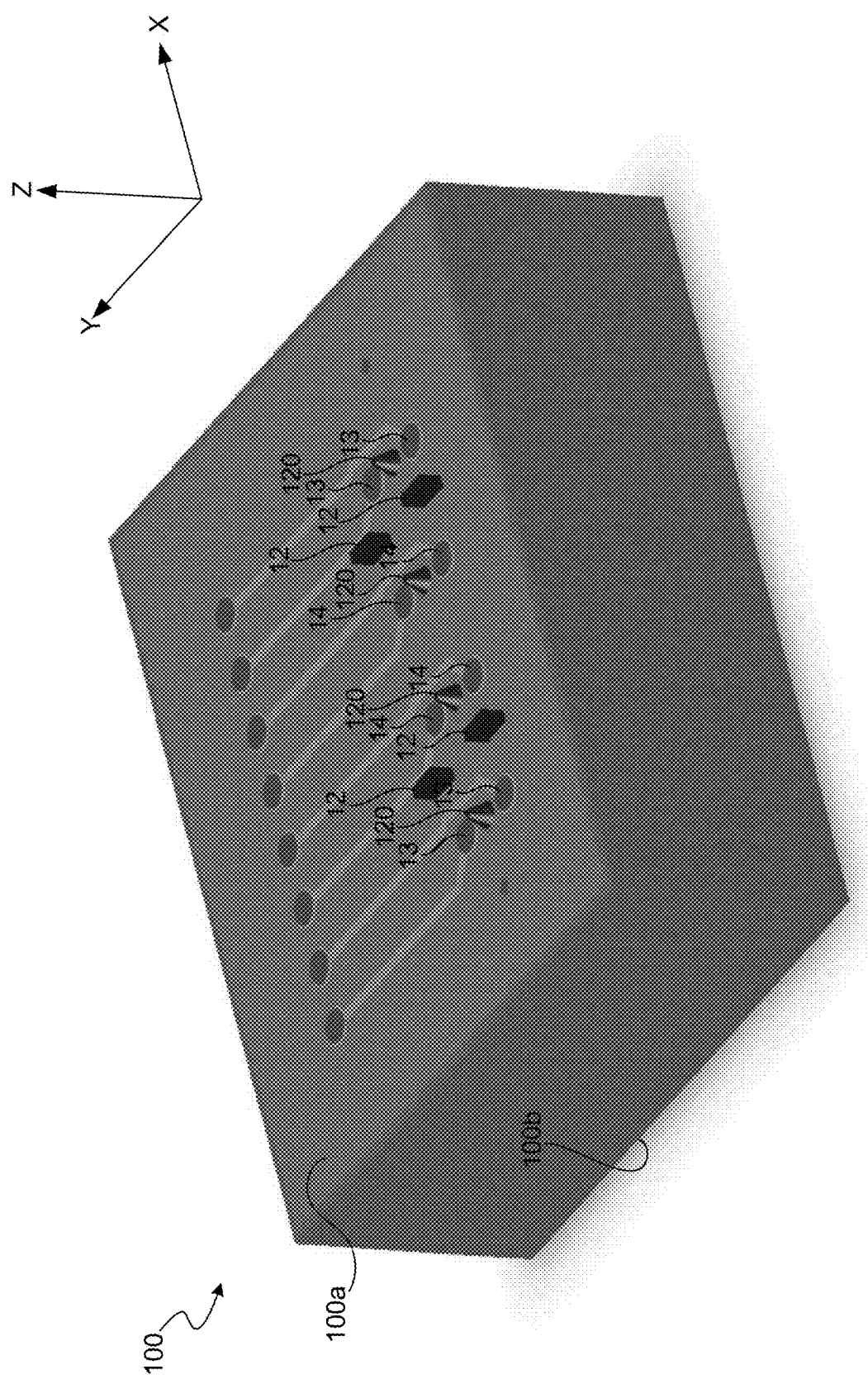
FIG. 15 illustrates a top perspective view of the submount in accordance with a representative embodiment in which the submount is used as a mount for at least a first light detector chip of a parallel optical communications module.
Figure 16:
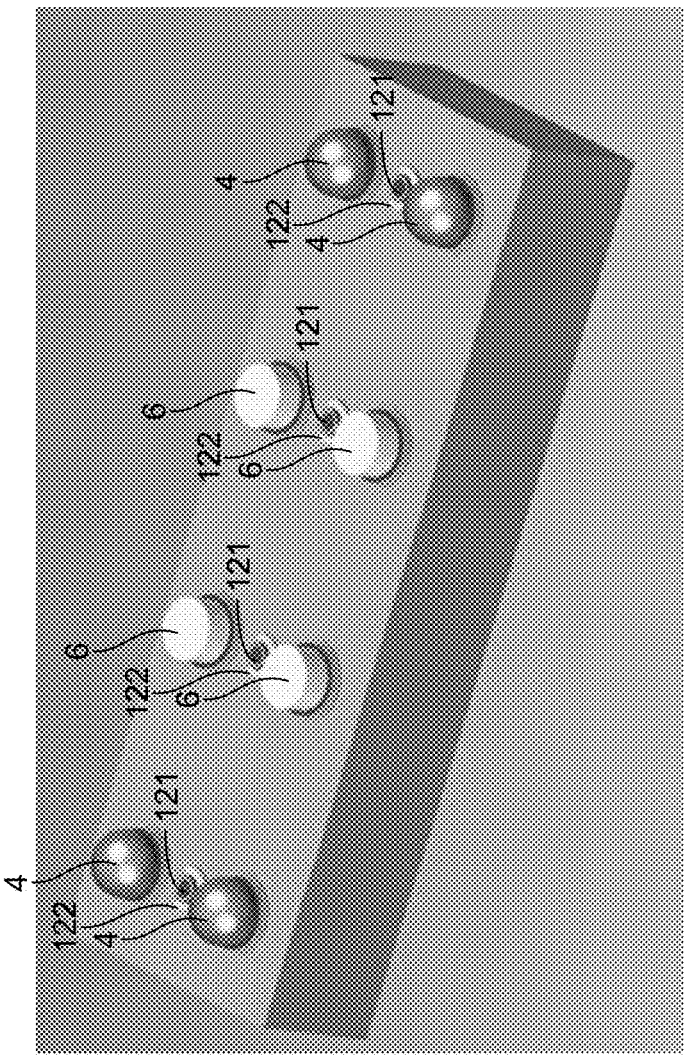
FIG. 16 illustrates a top perspective view of the first light detector chip in accordance with a representative embodiment that is mount on the submount shown in FIG. 15.
Figure 17:
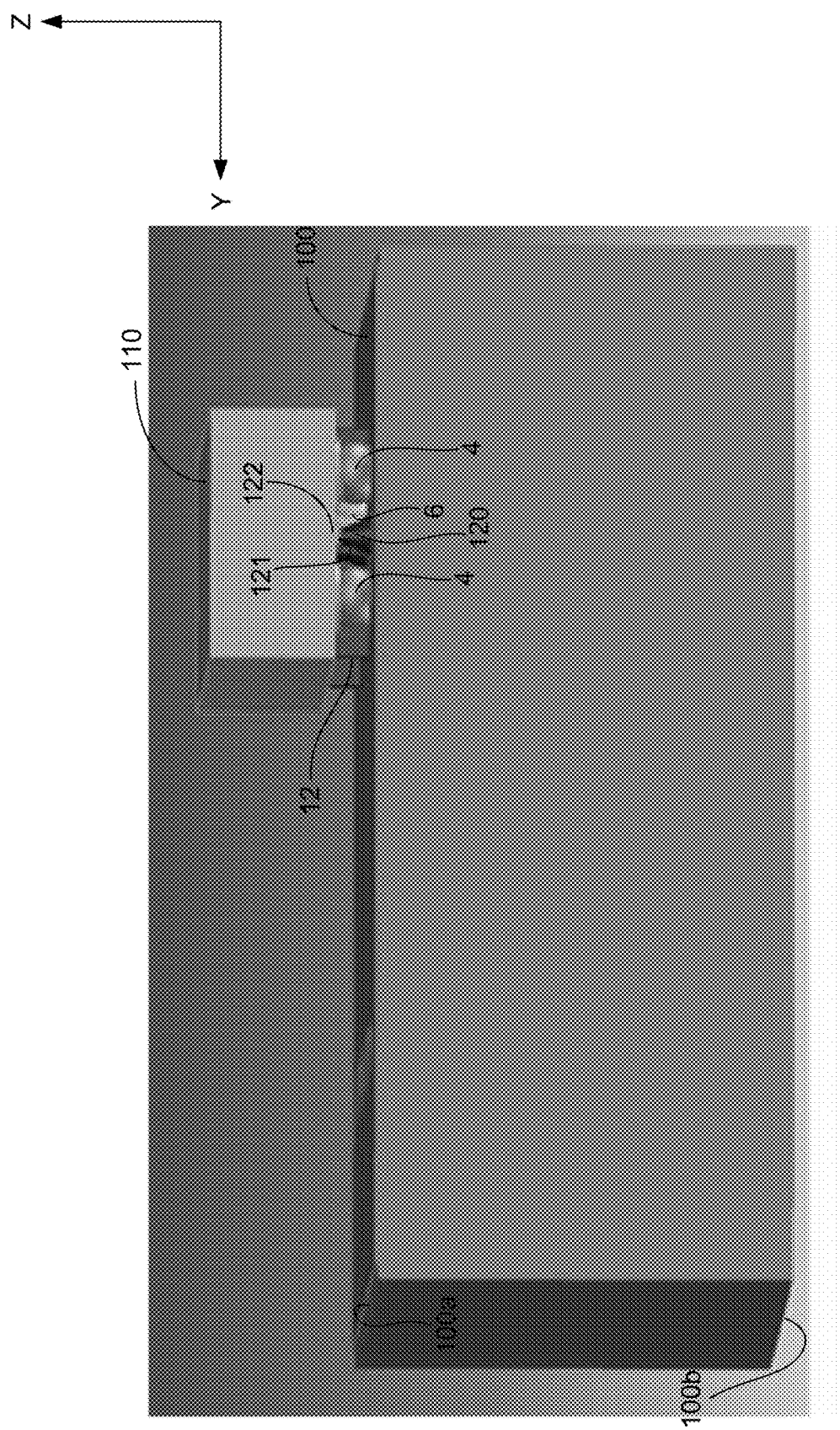
FIG. 17 illustrates a side perspective view of the submount shown in FIG. 15 with the first light detector chip shown in FIG. 16 mounted on a top surface of the submount.

FIG. 15 illustrates a top perspective view of the submount 100 in accordance with a representative embodiment in which the submount 100 is used as a mount for at least a first light detector chip of a parallel optical communications module (not shown). FIG. 16 illustrates a top perspective view of the first light detector chip 110 in accordance with a representative embodiment. FIG. 17 illustrates a side perspective view of the submount 100 shown in FIG. 15 with a first light detector chip 110 shown in FIG. 16 mounted on a top surface 100a of the submount 100. The passive alignment system that is used to align the first light detector chip 110 with the submount 100 in the X, Y and Z-dimensions is identical to the passive alignment system described above with reference to FIGS. 1-3 and 5A-6C. In other words, the transition of the first meltable elements 4 from the first pre-molten state to the first molten state aligns the first light detector chip 110 with the submount 100 in the X- and Y-dimensions and the transition of the second meltable elements 6 from the second pre-molten state to the second molten state pulls the first light detector chip 110 into alignment with the submount 100 in the Z-dimension by placing the second ends of the standoff devices 12 in abutment with the bottom surface 110*a* of the first light detector chip 110.

In addition, the top surface 100*a* of the submount 100 has cone-shaped optical elements 120 disposed thereon that couple light into the apertures 121 of respective light detectors 122 of the first light detector chip 110. In accordance with this embodiment, the light detectors 122 are PIN diodes. As indicated above, in optical receivers, the apertures of photodiodes are decreasing in size due to requirements for higher speed, which is making it increasingly difficult to use passive alignment devices and techniques to precisely align the apertures of the PIN diodes with the ends of multimode fibers, which are larger in diameter than single mode fibers. In accordance with this representative embodiment, ends of a plurality of optical fibers (not shown), which may be single mode or multimode fibers, are optically coupled to the bottom surface 100*b* of the submount 100 and are axially aligned with the respective cone-shaped optical elements 120. Each cone-shaped optical element 120 has a relatively wide base portion that is in contact with the top surface 100*a* of the submount 100 and a relatively narrow tip portion that is spaced apart from the respective base portion by a preselected distance. Each base portion is in precise alignment with a respective optical fiber end coupled to the bottom surface 100*b* of the submount 100.

The cone-shaped optical elements 120 and methods for making them are disclosed in U.S. Pat. No. 9,547,231 (hereinafter referred to as "the '231 patent"), which is assigned to the assignee of the present application and which is incorporated herein by reference in its entirety. As described in the '231 patent, the cone-shaped optical elements 120 have a light-collecting optical microstructure that ensures that light propagating toward the tip portion that is incident on the inner walls of the cone-shaped optical element 120 is reflected by total internal reflection onto the aperture, i.e., the active area of the PIN diode. By using the cone-shaped optical elements 120, the apertures 121 of the PIN 122 can be smaller in diameter than the optical fibers, and yet the light that passes out of the ends of the optical fibers will be coupled onto the respective apertures 121. This is especially well suited for alignment of PIN apertures with multimode fibers, which have large diameters (about 50 microns).

In accordance with a representative embodiment, the standoff devices 12 and the cone-shaped optical elements 120 are formed during the same process, which is typically molding, but could instead be photolithography. Because the aperture 121 of a PIN diode can be on a mesa, i.e., a raised surface, there is a good chance that the tip portion of each cone-shaped optical element will need to be at a known offset in height (Z-direction) relative to the second ends of the standoff devices 12. Thus, during Z-dimensional alignment, the transition of the second meltable elements 6 from the second pre-molten state to the second molten state causes the second ends of the standoff devices 12 to be placed in abutment with the bottom surface 110*a* of the first light detector chip 110 and causes the tip portions of the cone-shaped optical elements 120 to be placed in abutment with the respective apertures 121. It should be noted that because the X, Y locations and the heights in the Z-direction of the cone-shaped optical elements 120 can be just as precisely controlled as the X, Y locations and heights in the Z-direction of the standoff devices 12, the cone-shaped optical elements 120 can be used in place of the standoff devices 12.

It can be seen from the above description that the representative embodiments described herein enable a plurality of optical fibers or waveguides to be simultaneously passively aligned with a plurality of respective light sources or light detectors (e.g., lasers or PIN diodes) with sub-micron accuracy. It should be noted, however, that embodiments described herein are intended to demonstrate the principles and concepts of the invention and that the invention is not limited to these embodiment. For example, alignment features that are different from those described above can be used to perform alignment. These and many other modifications can be made to the representative embodiment without deviating from the scope of the invention, as will be understood by those of skill in the art in view of the description provided herein.

What is claimed is:

1. An alignment system for aligning first and second surfaces in three dimensions, the alignment comprising: a first set of first meltable elements disposed at a first set of preselected locations on the first surface, wherein the first meltable elements transition from a first pre-molten state to a first molten state when subjected to a first temperature; a second set of second meltable elements disposed at a second set of preselected locations on one of the first surface and a second surface, wherein the second meltable elements transition from a second pre-molten state to a second molten state when subjected to a second temperature that is higher than the first temperature; and a first set of first standoff devices having first ends that are secured to one of the first and second surfaces and second ends that are located a preselected distance away from the respective first ends, wherein in the first molten state, the first meltable elements control alignment of the first and second surfaces with one another in first and second dimensions and wherein in the second molten state, the second meltable elements and the first standoff devices control alignment of the first and second surfaces with one another in a third dimension by having the first standoff devices abut respective reference surface areas that are aligned with an optical axis of the one or more lasers in the third dimension.

2. The alignment system of claim 1, wherein when the first and second surfaces are facing one another such that the first meltable elements are in contact with respective first electrical contacts disposed on the second surface, the second meltable elements, in the second pre-molten state, are generally aligned with and spaced apart from respective second electrical contacts disposed on whichever of the first and second surfaces is facing the second meltable elements and the second ends of the standoff devices are generally aligned with and spaced apart from the respective reference surface areas of whichever of the first and second surfaces is facing the second ends of the standoff devices.

3. The alignment system of claim 2, wherein in the first molten state of the first meltable elements, surface tension between the first meltable elements and the respective first electrical contacts disposed on the second surface aligns the first and second surfaces with one another in the first and second dimensions, and wherein in the second molten state of the second meltable elements, the second meltable elements come into contact with the respective second electrical contacts creating surface tension there between that brings the second ends of the first standoff devices into abutment with the respective reference surface areas to align the first and second surfaces with one another in the third dimension.

4. The alignment system of claim 3, wherein the first and second dimensions are perpendicular to and co-planar with one another.

5. The alignment system of claim 4, wherein the first and second dimensions are perpendicular to the third dimension.

6. The alignment system of claim 5, wherein the first and second dimensions are parallel to the first surface and wherein the third dimension is perpendicular to the second surface.

7. The alignment system of claim 2, wherein the first and second surfaces are first and second surfaces of a first laser chip and a submount, respectively, the first laser chip having a plurality of first lasers, each of the first lasers having an optical axis that is parallel to the first dimension and perpendicular to the second dimension, and wherein the optical axes of the first lasers and the reference surface areas are co-planar.

8. An alignment system for aligning first and second surfaces in three dimensions, the alignment comprising:
a first set of first meltable elements disposed at a first set of preselected locations on the first surface, wherein the first meltable elements transition from a first pre-molten state to a first molten state when subjected to a first temperature;
a second set of second meltable elements disposed at a second set of preselected locations on one of the first surface and a second surface, wherein the second meltable elements transition from a second pre-molten state to a second molten state when subjected to a second temperature that is higher than the first temperature; and
a first set of first standoff devices having first ends that are secured to one of the first and second surfaces and second ends that are located a preselected distance away from the respective first ends, wherein in the first molten state, the first meltable elements control alignment of the first and second surfaces with one another in first and second dimensions and wherein in the second molten state, the second meltable elements and the first standoff devices control alignment of the first and second surfaces with one another in a third dimension, wherein when the first and second surfaces are facing one another such that the first meltable elements are in contact with respective first electrical contacts disposed on the second surface, the second meltable elements, in the second pre-molten state, are generally aligned with and spaced apart from respective second electrical contacts disposed on whichever of the first and second surfaces is facing the second meltable elements and the second ends of the standoff devices are generally aligned with and spaced apart from respective reference surface areas of whichever of the first and second surfaces is facing the second ends of the standoff devices, wherein the first and second surfaces are first and second surfaces of a first laser chip and a submount, respectively, the first laser chip having a plurality of first lasers, each of the first lasers having an optical axis that is parallel to the first dimension and perpendicular to the second dimension, and wherein the optical axes of the first lasers and the reference surface areas are co-planar, wherein the submount has first, second, third and fourth edges, and wherein the first ends of the first standoff devices of the first set of first standoff devices are coupled to the second surface of the submount along the first edge of the submount, the submount further comprising:
a first integrated circuit (IC) chip mounted on the submount and electrically interconnected with the first and second meltable elements;
second, third and fourth sets of the first meltable elements disposed at preselected locations on the second surface of the submount along the second, third and fourth edges, respectively, of the submount;
second, third and fourth sets of the first standoff devices having first ends that are coupled to the second surface of the submount along the second, third and fourth edges, respectively, of the submount; and
an optical interface device having third, fourth and fifth surfaces having second, third and fourth sets, respectively, of the second meltable elements disposed thereon at preselected locations, wherein the third, fourth and fifth surfaces of the optical interface device face the second surface of the submount such that the first meltable elements of the second, third and fourth sets are in contact with respective electrical contacts disposed on the third, fourth and fifth surfaces, respectively, of the optical interface device and such that the second meltable elements of the second, third and fourth sets are generally aligned with and spaced apart from respective electrical contacts disposed on the second surface of the submount along the second, third and fourth edges, respectively, and wherein the second ends of the first standoff devices of the second, third and fourth sets of the first standoff devices are spaced apart from the third, fourth and fifth surfaces, respectively.

9. The alignment system of claim 8, wherein in the first molten state of the first meltable elements, surface tension between the first meltable elements of the second, third and fourth sets and the respective electrical contacts disposed on the third, fourth and fifth surfaces aligns the optical interface device with the submount in the first and second dimensions, and wherein in the second molten state of the second meltable elements of the second, third and fourth sets, surface tension between the second meltable elements of the second, third and fourth sets and the respective electrical contacts disposed on the third, fourth and fifth surfaces creates a force that causes the second ends of the first standoff devices of the second, third and fourth sets to abut the third, fourth and fifth surfaces, respectively, of the optical interface device to align the optical interface device with the submount in the third dimension.

10. The alignment system of claim 9, further comprising:
an optical assembly mechanically coupled with the optical interface device such that the optical assembly is aligned with the first laser chip in the first, second and third dimensions, the optical assembly holding a plurality of optical fibers, each optical fiber being axially aligned in the first, second and third dimensions with a respective first laser of the plurality of first lasers.

11. The alignment system of claim 3, wherein the first and second surfaces are first and second surfaces of a first light detector chip and a submount, respectively, the first light detector chip having a plurality of first light detectors, each of the first light detectors having an optical axis that is substantially normal to the first surface of the first light detector chip and perpendicular to the first and second dimensions.

12. The alignment system of claim 11, wherein the second surface of the submount has a plurality of cone-shaped optical elements disposed thereon, each cone-shaped optical element having a base portion that is in contact with the second surface of the submount and having a narrow tip portion that is spaced apart from the respective base portion by a preselected distance, each base portion being wider than the respective tip portion and being in precise alignment with a respective optical fiber end coupled to a third surface of the submount that is opposite and parallel to the second surface of the submount, and wherein each tip portion is aligned with a respective aperture of a respective light detector of the plurality of light detectors.

13. The alignment system of claim 12, wherein the tip portions come into abutment with the respective apertures when the second ends of the first standoff devices come into abutment with the respective reference surface areas.

14. An optical communications system comprising:
a submount;
at least a first laser chip comprising at least a first laser;
at least a first integrated circuit mounted on the submount and electrically interconnected with electrical contacts of the first laser chip;
an optical interface device;
an optical assembly mechanically coupled with the optical interface device and aligned with the optical interface device in a first dimension, a second dimension, and a third dimension, the optical assembly having at least a first optical waveguide; and
an alignment system for precisely aligning the submount and the first laser chip with one another in the first, second and third dimensions and for precisely aligning the submount and the optical interface device with one another in the first, second and third dimensions to thereby precisely align an end of said at least a first optical waveguide with a respective optical axis of said at least a first laser, the alignment system comprising first meltable elements that transition from a first pre-molten state to a first molten state when subjected to a first temperature, second meltable elements that transition from a second pre-molten state to a second molten state when subjected to a second temperature that is higher than the first temperature, one or more reference surface areas that are substantially co-planar with the at least a first laser, and first standoff devices having first and second ends, wherein the one or more reference surface areas are configured to interface with the first standoff devices to facilitate alignment in the third dimension.

15. The optical communications system of claim 14, wherein the first laser chip has a first surface and wherein the submount has a second surface that faces the first surface, a first set of the first meltable elements being disposed on respective electrical contacts located on the first surface, a second set of the second meltable elements being disposed on respective electrical contacts located on the first surface, and wherein a first set of the first standoff devices have their first ends coupled to the second surface and their second ends located a preselected distance away from the second surface, and wherein in the first molten state, the first meltable elements of the first set of the first meltable elements control alignment of the first laser chip and the submount with one another in the first and second dimensions and wherein in the second molten state, the second meltable elements of the second set of the second meltable elements and the first standoff devices of the first set of the first standoff devices control alignment of the first laser chip and the submount with one another in the third dimension.

16. The optical communications system of claim 15, wherein in the first molten state of the first meltable elements of the first set of the first meltable elements, surface tension between the first meltable elements and the respective electrical contacts disposed on the second surface aligns the first and second surfaces with one another in the first and second dimensions, and wherein in the second molten state of the second meltable elements of the second set of the second meltable elements, the second meltable elements of the second set of the second meltable elements come into contact with the respective electrical contacts disposed on the second surface creating surface tension there between that brings the second ends of the first standoff devices into abutment with the one or more reference surface areas to align the submount and the first laser chip with one another in the third dimension.

17. The optical communications system of claim 16, wherein the submount has first, second, third and fourth edges, and wherein the first ends of the first standoff devices of the first standoff devices are coupled to the second surface of the submount along the first edge of the submount.

18. The optical communications system of claim 17, further comprising:
second, third and fourth sets of the first meltable elements disposed at preselected locations on the second surface of the submount along the second, third and fourth edges, respectively, of the submount;
second, third and fourth sets of the first standoff devices having first ends that are coupled to the second surface of the submount along the second, third and fourth edges, respectively, of the submount; and
second, third and fourth sets of the second meltable elements disposed at preselected locations on third, fourth and fifth surfaces, respectively, of the optical interface device, wherein the third, fourth and fifth surfaces of the optical interface device face the second surface of the submount such that the first meltable elements of the second, third and fourth sets are in contact with respective electrical contacts disposed on the third, fourth and fifth surfaces, respectively, of the optical interface device and such that, in the second pre-molten state, the second meltable elements of the second, third and fourth sets of the second meltable elements are generally aligned with and spaced apart from respective electrical contacts disposed on the second surface of the submount along the second, third and fourth edges, respectively, and the second ends of the second, third and fourth sets of the first standoff devices are spaced apart from the third, fourth and fifth surfaces, respectively.

19. The optical communications system of claim 18, wherein in the first molten state of the first meltable elements of the second, third and fourth sets of the first meltable elements, surface tension between the first meltable elements of the second, third and fourth sets and the respective electrical contacts disposed on the third, fourth and fifth surfaces aligns the optical interface device with the submount in the first and second dimensions, and wherein in the second molten state of the second meltable elements of the second, third and fourth sets, surface tension between the second meltable elements of the second, third and fourth sets and the respective electrical contacts disposed on the third, fourth and fifth surfaces creates a force that causes the second ends of the second, third and fourth sets of the first standoff devices to abut the third, fourth and fifth surfaces, respectively, of the optical interface device to align the optical interface device with the submount in the third dimension.

20. The optical communications system of claim 19, wherein the first laser chip has a plurality of the first lasers, and wherein the optical assembly has a plurality of optical waveguides, each optical waveguide being axially aligned in the first, second and third dimensions with a respective first laser of the plurality of first lasers.

21. The optical communications system of claim 14, wherein the first and second dimensions are perpendicular to and co-planar with one another.

22. The optical communications system of claim 21, wherein the first and second dimensions are perpendicular to the third dimension.

23. The optical communications system of claim 22, wherein the first and second dimensions are parallel to the first surface and wherein the third dimension is perpendicular to the first surface.

24. The optical communications system of claim 14, wherein the optical assembly has an array waveguide grating device formed therein, the array waveguide grating device including said at least a first optical waveguide.

* * * * *